United States Patent
Hirata et al.

(10) Patent No.: US 7,359,146 B2
(45) Date of Patent: Apr. 15, 2008

(54) PERPENDICULAR MAGNETIC RECORDING ELEMENT HAVING STACKED FM AND AFM FILMS APPLYING MAGNETIC BIAS ALONG EASY AXIS OF SOFT MAGNETIC FILM

(75) Inventors: Kei Hirata, Tokyo (JP); Kiyoshi Noguchi, Tokyo (JP); Tetsuya Mino, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 442 days.

(21) Appl. No.: 10/891,182

(22) Filed: Jul. 15, 2004

(65) Prior Publication Data

US 2005/0013044 A1 Jan. 20, 2005

(30) Foreign Application Priority Data

Jul. 16, 2003 (JP) ............................. 2003-275663

(51) Int. Cl.
*G11B 5/127* (2006.01)
(52) U.S. Cl. ...................................... 360/125
(58) Field of Classification Search ................ 360/125, 360/126
See application file for complete search history.

(56) References Cited

U.S. PATENT DOCUMENTS 7,070,716 B2 * 7/2006 Lam ........................... 360/126

FOREIGN PATENT DOCUMENTS

| JP | 60-136016 | | 7/1985 |
|---|---|---|---|
| JP | 04-285713 | | 10/1992 |
| JP | 6-162442 A | * | 6/1994 |
| JP | 7-14118 | | 1/1995 |
| JP | 8-167122 | | 6/1996 |
| JP | 2002-270920 | | 9/2002 |
| JP | 2002-324303 | | 11/2002 |
| JP | 2004-62946 | | 2/2004 |
| JP | 2004-103204 | | 4/2004 |
| JP | 2004-139676 | | 5/2004 |
| JP | 2004-192744 | | 7/2004 |
| JP | 2004-199816 | | 7/2004 |
| JP | 2004-234780 | | 8/2004 |
| JP | 2004-281023 | | 10/2004 |
| JP | 2004-310968 | | 11/2004 |
| JP | 2004-326990 | | 11/2004 |

OTHER PUBLICATIONS

K. Nakamoto, et al., "Single-Pole/TMR Heads for 100 Gb/in$^2$ Perpendicular Recording", Journal of the Applied Magnetics Association of Japan, vol. 27, No. 3, 2003, pp. 124-127.

* cited by examiner

*Primary Examiner*—Julie Anne Watko
(74) *Attorney, Agent, or Firm*—Oblon, Spivak, McClelland, Maier & Neustadt, P.C.

(57) ABSTRACT

The soft magnetic film takes its hard axis along the direction in which a magnetic field is generated and its easy axis along a direction perpendicular to the direction of the writer magnetic field. The magnetic bias film applies a magnetic bias along the easy axis to the soft magnetic film.

6 Claims, 22 Drawing Sheets

PERPENDICULAR MAGNETIC RECORDING ELEMENT HAVING STACKED FM AND AFM FILMS APPLYING MAGNETIC BIAS ALONG EASY AXIS OF SOFT MAGNETIC FILM

TECHNICAL FIELD

The present invention relates to a perpendicular magnetic recording element, a magnetic head, a magnetic head device and a magnetic recording/reproducing apparatus.

BACKGROUND OF THE INVENTION

In order to improve the recording capacity of a hard disk drive (hereafter referred to as an HDD), the track density must be increased by reducing the magnetic pole width at the magnetic writer head and, at the same time, the recording capability must be improved by utilizing a material having a high saturation magnetization. When a perpendicular magnetic recording method is adopted, a high coercivity must be assured in the medium in order to improve the recording resolution. In addition, in order to assure the desired overwrite characteristics in the writer head, the writer magnetic pole must be constituted by using a material with a high saturation magnetization such as an FeCo-system material, a CoNiFe ternary alloy film, FeC or FeN.

However, while the use of the type of material described above to constitute the magnetic pole improves the recording capability, it leads to a problem of so-called pole erase at a perpendicular magnetic writer head whereby a signal having been recorded by a writer magnetic pole becomes erased when a write operation is not executed.

A soft magnetic film at the perpendicular magnetic writer head imparts a magnetic flux with its magnetic anisotropy directed along the transverse direction to the head by assuming a magnetizing rotation mode. Namely, the residual magnetization manifesting toward the medium is minimized so as to avoid the generation of an excess residual magnetic flux when the magnetic writer head is not engaged in a write operation.

However, since the front end of the writer magnetic pole width comes to narrow, shape form anisotropy is induced which destabilizes the structure of the magnetic domain. This instability in the magnetic domain structure is thought to be the root cause of the pole erase phenomena, since it induces trapping at the magnetic wall, which keeps the direction of the magnetization unchanged toward the medium even after the write operation ends, allowing the magnetic flux to leak into the medium, and it makes erasing the recorded data on the medium.

A soft magnetic multilayer film achieved by laminating different types of magnetic films or magnetic films and nonmagnetic films over several layers to several tens of layers is used as a means for stabilizing the magnetic domain structure in the related art. In addition, while there is a longitudinal writer head in the related art adopting a structure having a hard, thin magnetic film arranged over the shield area, the distance to the soft magnetic film is considerable and thus, this structure is not effective enough to prevent pole erase at the perpendicular writer head.

To summarize, the problem of pole erase occurring when a perpendicular magnetic recording method is used cannot be completely eliminated simply by stabilizing the magnetic domain structure of the soft magnetic film because of the magnetic field generated from the perpendicular medium.

Furthermore, if the magnetic pole width is further reduced to keep pace with the ever increasing need to improve recording density, the shape form anisotropy will become even more dominant to allow a significant extent of residual magnetization at the magnetic pole tip toward the medium surface, which is bound to exacerbate the problem.

SUMMARY OF THE INVENTION

It is an object of the present invention to provide a perpendicular magnetic recording element that eliminates the problem of pole erase inherent in perpendicular magnetic recording, and a magnetic head, a magnetic head device and a magnetic recording/reproducing apparatus achieved by using this perpendicular magnetic recording element.

In order to achieve the object described above, the perpendicular magnetic recording element according to the present invention has a writer magnetic pole film which includes a soft magnetic film and a magnetic bias film.

The soft magnetic film takes its hard axis along the direction in which magnetic field is generated and its easy axis along a direction perpendicular to the direction of the magnetic field.

The magnetic bias film applies a magnetic bias along the easy axis to the soft magnetic film.

As explained above, since the writer magnetic pole film of the perpendicular magnetic recording element according to the present invention includes a soft magnetic film having a hard axis taken along the direction in which the magnetic field is generated and an easy axis taken along the direction perpendicular to the direction of the magnetic field, the direction in which the soft magnetic film becomes magnetized can be rotated from the direction extending along the easy axis to the direction extending along the hard axis by supplying a write current to a coil film to write data through perpendicular magnetic recording at the perpendicular magnetic recording medium with the resulting magnetic field.

In addition, the writer magnetic pole film of the perpendicular magnetic recording element according to the present invention includes a magnetic bias film which applies a magnetic bias along the easy axis to the soft magnetic film. As a result, when a write operation is not executing the soft magnetic film included in the writer magnetic pole film receives the magnetic bias applied by the magnetic bias film and is magnetized in a stable manner along the easy axis perpendicular to the direction of the perpendicular writer magnetic field. Thus, the problem of the pole erase phenomena attributable to the residual magnetic flux generated while the write operation is not executed can be eliminated with a high level of reliability according to the present invention.

The magnetic bias film may be provided only at one surface of the soft magnetic film, or such a magnetic bias film may be provided at both surfaces of the soft magnetic film.

The magnetic bias film according to the present invention may assume any of various modes. Examples of such modes are explained below.

1. (First Mode)

The magnetic bias film in the first mode includes a hard magnetic film. The hard magnetic film may be arranged adjacent to the soft magnetic film so as to be exchange coupled with the soft magnetic film. In such a case, the magnetic field generated through the magnetic static coupling is used to apply a bias magnetic field to the soft magnetic film. Alternatively, the magnetic bias film may further include a nonmagnetic film provided between the hard magnetic film and the soft magnetic film. When this structure is adopted, the static magnetic field generated at the hard magnetic film is applied to the soft magnetic film via the nonmagnetic film. It is desirable that the hard magnetic film have a film thickness set within a range of 5 to 50 nm. In addition, the nonmagnetic film used in the alternative structure should have a film thickness within a range of 0.5 to 30 nm. The hard magnetic film should preferably have a coercivity the level of which is within a range of (500 to 5000)×79.6 (A/m).

2. (Second Mode)

The magnetic bias film assuming the second mode includes a first ferromagnetic film and a first antiferromagnetic film. The first ferromagnetic film and the first antiferromagnetic film should be stacked so as to be exchange coupled. In this mode, the magnetic field generated through the magnetic static coupling is used to apply a bias magnetic field to the soft magnetic film. The magnetic field generated through the magnetic static coupling may be utilized in either of the following two modes.

As a first option, the stacked film constituted with the first ferromagnetic film and the first antiferromagnetic film is arranged adjacent to the soft magnetic film. In this structure, the magnetic field generated through the magnetic static coupling of the first ferromagnetic film and the first antiferromagnetic film directly magnetizes the soft magnetic film.

In the other option, the magnetic bias film includes a first nonmagnetic film. The first nonmagnetic film is arranged between the stacked film constituted with the first ferromagnetic film and the first antiferromagnetic film and the soft magnetic film. In this case, the magnetic field generated through the magnetic static coupling of the first ferromagnetic film and the first antiferromagnetic film is applied to the soft magnetic film via the nonmagnetic film.

When the second mode is adopted, it is desirable to set the film thickness of the first antiferromagnetic film within a range of 3 to 50 nm, the film thickness of the first ferromagnetic film within a range of 1 to 20 nm and the film thickness of the first nonmagnetic film within a range of 0.5 to 30 nm.

3. (Third Mode)

The magnetic bias film in the third mode includes a second antiferromagnetic film, a second ferromagnetic film, a first spacer film and a third ferromagnetic film.

The second antiferromagnetic film and the second ferromagnetic film are stacked so as to be exchange coupled. The first spacer film is arranged between the stacked film constituted with the second antiferromagnetic film and the second ferromagnetic film and the third ferromagnetic film. The third ferromagnetic film is arranged between the first spacer film and the soft magnetic film.

In this structure, the magnetic field generated through the magnetic static coupling of the second ferromagnetic film and the second antiferromagnetic film is applied to the third ferromagnetic film via the first spacer film, and a bias magnetic field is directly applied from the third ferromagnetic film to the soft magnetic film.

In an alternative structure that may be adopted in the third mode, the magnetic bias film includes a second antiferromagnetic film, a second ferromagnetic film, a first spacer film, a third ferromagnetic film and a second nonmagnetic film. The second antiferromagnetic film and the second ferromagnetic film are stacked so as to be exchange coupled. The first spacer film is arranged between the second ferromagnetic film and the third ferromagnetic film. The second nonmagnetic film is arranged between the third ferromagnetic film and the soft magnetic film.

In this case, the magnetic field generated through the magnetic static coupling of the second ferromagnetic film and the second antiferromagnetic film is applied to the third ferromagnetic film via the first spacer film and a bias magnetic field is applied to the soft magnetic film from the second ferromagnetic film and the third ferromagnetic film via the second nonmagnetic film.

When the third mode is adopted, it is desirable to ensure that the direction of the magnetization of the second ferromagnetic film and the direction of the magnetization of the third ferromagnetic film are antiparallel to each other and that the film thickness of the second antiferromagnetic film be within a range of 3 to 50 nm.

In addition, it is desirable that the magnetic film thickness $Mt2$ of the second ferromagnetic film and the magnetic film thickness $Mt3$ of the third ferromagnetic film be not equal to each other and be set within ranges that satisfy a relationship expressed as;

$$|Mt2-Mt3|=5 \text{ to } 100(T \cdot nm)$$

It is desirable to set the film thickness of the first spacer film equal to or smaller than 2 nm and the film thickness of the second nonmagnetic film within a range of 0.5 to 10 nm.

4. (Fourth Mode)

While the magnetic bias film in the fourth mode includes a second antiferromagnetic film, a second ferromagnetic film, a first spacer film and a third ferromagnetic film as does the magnetic bias film in the third mode, the direction of the magnetization of the second ferromagnetic film and the direction of the magnetization of the third ferromagnetic film are parallel to each other in the fourth mode.

In an alternative structure that may be adopted in the fourth mode, the magnetic bias film includes a second antiferromagnetic film, a second ferromagnetic film, a first spacer film, a third ferromagnetic film and a second nonmagnetic film. The second antiferromagnetic film and the second ferromagnetic film are stacked so as to be exchange coupled. The first spacer film is arranged between the second ferromagnetic film and the third ferromagnetic film. The second nonmagnetic film is arranged between the third ferromagnetic film and the soft ferromagnetic film.

When the fourth mode is adopted, it is desirable to ensure that the magnetic film thickness of the second ferromagnetic film and the magnetic film thickness of the third ferromagnetic film are both within a range of 5 to 100 (T·nm). In addition, the film thickness of the second antiferromagnetic film should be preferably set within a range of 0.5 to 10 nm.

Moreover, it is desirable to set the film thickness of the first spacer film equal to or smaller than 2 nm and the film thickness of the second nonmagnetic film within a range of 0.5 to 10 nm.

5. (Fifth Mode)

The magnetic bias film in the fifth mode includes a hard magnetic film arranged at the ends of the soft magnetic film on both sides. A bias magnetic field is applied along the easy axis to the soft magnetic film from the hard magnetic films arranged at the two ends.

It is desirable to set the film thickness of each hard magnetic film to a value equal to or less than half of the film thickness of the soft magnetic film with the distance between the soft magnetic film and a hard magnetic film set within a range of 0 to 50 nm.

The present invention also discloses a thin film magnetic head, a magnetic head device and a magnetic recording/reproducing apparatus achieved by using the magnetic recording element described above.

Other objects, structural features and advantages of the present invention are explained in further detail by referring to the attached drawings, which are presented as examples of the present invention.

DESCRIPTION OF THE PREFERRED EMBODIMENTS

Figure 1:
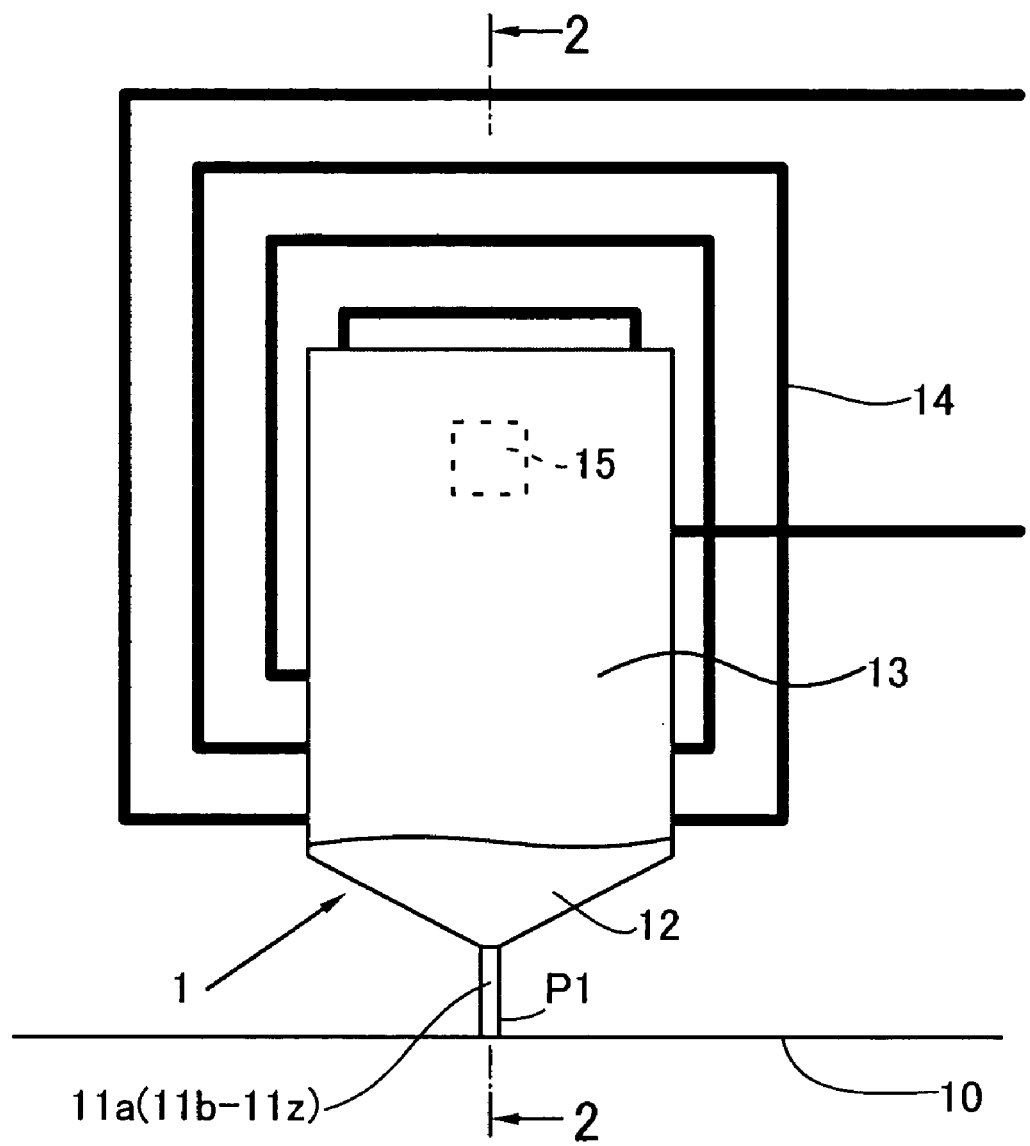
FIG. 1 is a in plane for top view of the magnetic recording element according to the present invention.
Figure 2:
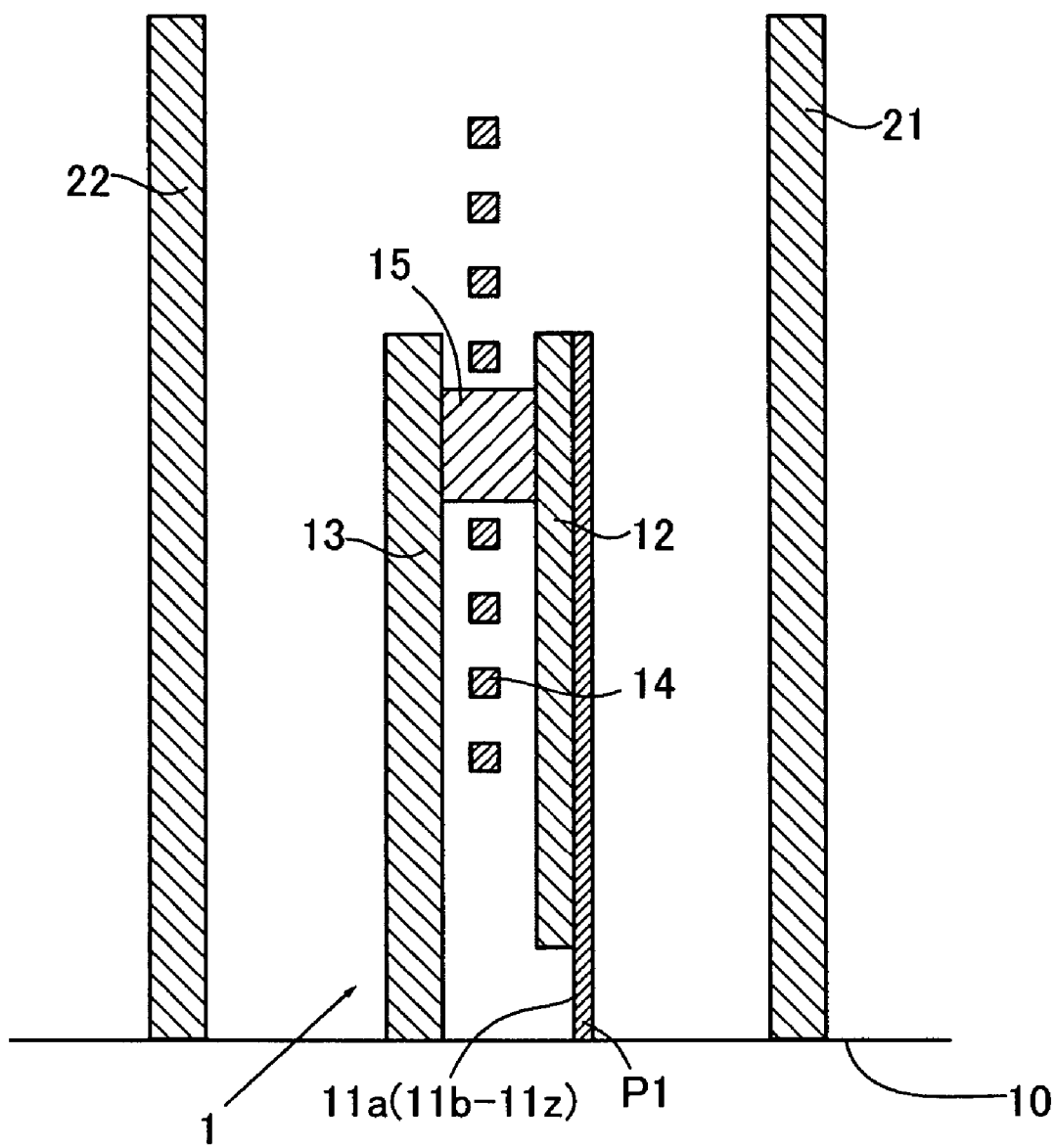
FIG. 2 is a cross-sectional view taken along line 2-2 in FIG. 1.
Figure 3:
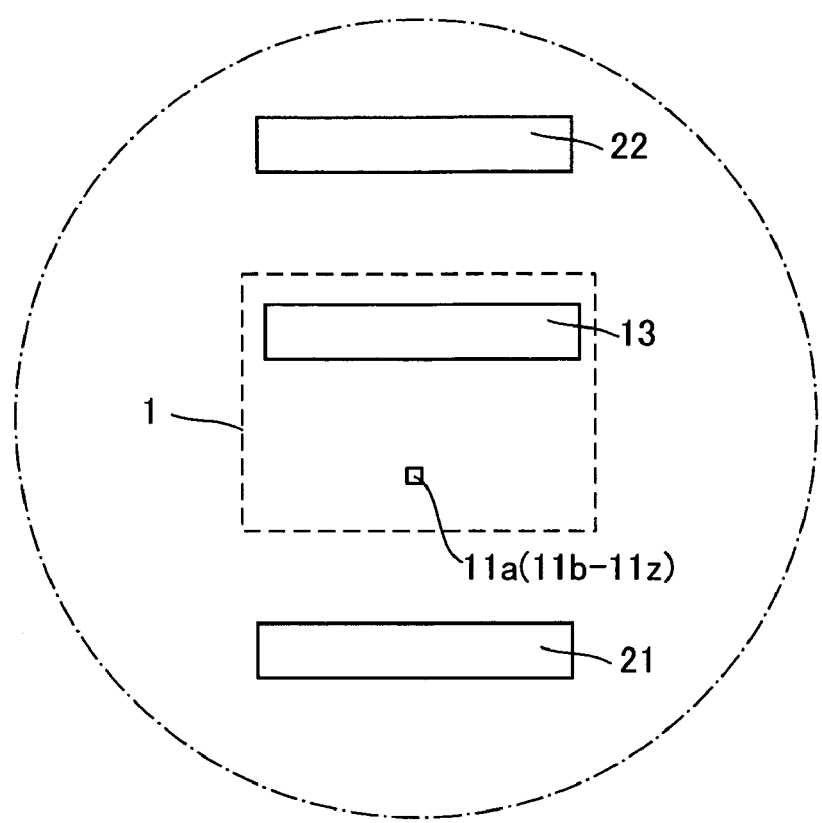
FIG. 3 is a view taken at an end surface of the perpendicular magnetic recording element shown in FIGS. 1 and 2.

FIG. 1 is a plan view of the magnetic recording element according to the present invention, FIG. 2 is a sectional view taken along line 2-2 in FIG. 1 and FIG. 3 is a view of an end surface of the perpendicular magnetic recording element shown in FIGS. 1 and 2. While the magnetic recording element according to the present invention is most often adopted in a flying-type thin film magnetic head, its application is not limited to floating-type thin film magnetic heads and it may be utilized in a wide range of applications for high-density recording in the field of magnetic recording.

A recording element unit 1 is magnetically shielded with a first shield film 21 and a second shield film 22 arranged over a distance from each other. An insulating film constituted of, for instance, a metal oxide or an organic insulating material is arranged over the blank area surrounding the recording element unit 1, the first shield film 21 and the second shield film 22. The perpendicular magnetic recording element includes a air bearing surface 10 facing opposite a magnetic recording medium. The air bearing surface 10 in a thin film magnetic head is used as an air-bearing surface (hereafter referred to as an ABS).

The recording element unit 1 includes a writer magnetic pole film 11a (11b to 11z), an auxiliary magnetic pole film 12, a yoke film 13, a coil film 14 and a connecting portion 15. The writer magnetic pole film 11a (11b to 11z) has a front end drawn to a very fine point to constitute a writer magnetic pole end P1, with a yoke portion YK ranging to the rear of the writer magnetic pole end. The front end surface of the writer magnetic pole end P1 is set on the plane containing the air bearing surface 10. The auxiliary magnetic pole 12, which is arranged adjacent to the yoke portion YK of the writer magnetic pole film 11a (11b to 11z), concentrates a magnetic flux at the writer magnetic pole end P1 without inducing a magnetic saturation at the yoke portion YK.

The yoke film 13 is arranged over distances from the writer magnetic pole film 11a (11b to 11z) and the auxiliary magnetic pole film 12, and it is connected to the auxiliary magnetic pole film 12 through the connecting portion 15 further rearward relative to the air bearing surface 10. The magnetic flux imparted from the magnetic pole end P1 of the writer magnetic pole film 11a (11b to 11z) is gathered at the yoke film 13 which spreads widely.

The coil film 14 is arranged between the auxiliary magnetic pole film 12 and the yoke film 13 so as to the wind around the connecting portion 15 in a coil. The coil film 14 does not need to be arranged in a coil as shown in the figures, and it may instead assume another mode or another structure such as a helical form that runs around the yoke film 13.

According to the present invention, the writer magnetic pole film 11a (11b to 11z) includes a soft magnetic film 111 and a magnetic bias film, and the magnetic pole film takes on one of the first to fourth modes depending upon the specifics of the structure adopted in the magnetic bias film, as explained earlier. The following is an explanation of the magnetic pole films achieved in the first through fourth modes.

1. First Mode

Figure 4:
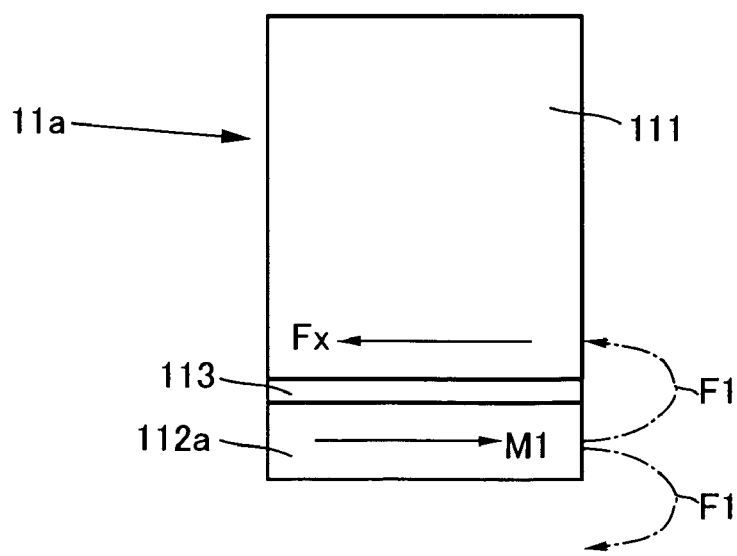
FIG. 4 is an enlarged sectional view of the magnetic pole film provided apt the magnetic recording element according to the present invention.

FIG. 4 is an enlarged cross-sectional view of the magnetic pole film 11a achieved in the first mode. The writer magnetic pole film 11a in the figure includes a soft magnetic film 111, a hard magnetic film 112a and a first nonmagnetic film 113. The hard magnetic film 112a and the first nonmagnetic film 113 are arranged adjacent to each other on the bottom side surface of the soft magnetic film 111. The soft magnetic film 111 may be constituted by adopting a material composition of the known art, such as FeCoZrO, FeCo, FeCoNi, CoNiFe, FeNiFe, FeCoN or FeN and so on.

Figure 5:
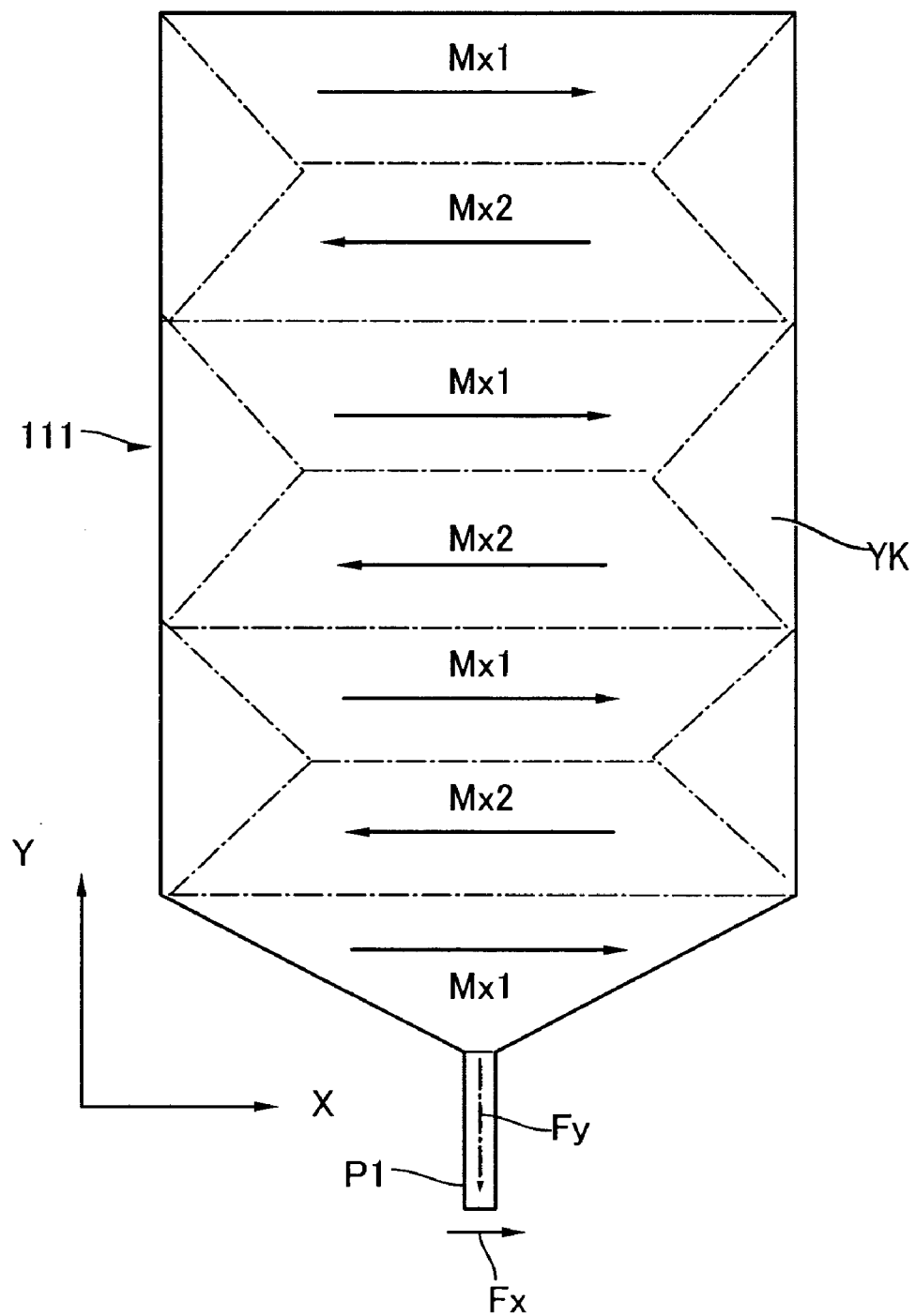
FIG. 5 shows the structure of the magnetic domain of the soft magnetic film when a write operation is not executed.

FIG. 5 shows the structure of the magnetic domain at the soft magnetic film 111 when a write operation is not executed. The soft magnetic film 111 assumes a hard axis Y along the direction of the writer magnetic field and assumes an easy axis X along a direction perpendicular to the direction of the writer magnetic field. Since the yoke portion YK of the soft magnetic film 111 ranges over a wide area, it becomes magnetized along the easy axis X as indicated by MX1 and MX2, thereby generating a stable magnetic wall. The writer magnetic pole end P1 of the soft magnetic film 111, which should also become magnetized along the easy axis X, is designed to have a fine point so as to achieve an extremely small track width to support high-density recording.

For this reason, the structure of the magnetic domain of the magnetic pole end P1 becomes unstable due to the shape-form anisotropy and part of the magnetic pole end P1 is still magnetized along the Fy direction due to the trapping at the magnetic wall even after the write operation ends to allow the magnetic flux to leak into the medium and, as a result, a pole erase occurs in the related art.

The magnetic bias film is used as a means for eliminating the problem of the pole erase phenomena described above. The magnetic bias film applies a magnetic bias along the easy axis X to the soft magnetic film 111. In the magnetic pole film 11a shown in FIG. 4, the magnetic bias film includes the hard magnetic film 112a and the first nonmagnetic film 113 which is arranged between the hard magnetic film 112a and the soft magnetic film 111. In this structure, a static magnetic field F1 generated through the magnetization M1 of the hard magnetic film 112a is applied to the soft magnetic film 111 via the nonmagnetic film 113 so as to magnetize the soft magnetic film 111 along the direction Fx which extends antiparallel to the direction of the magnetization M1. The hard magnetic film 112a may be constituted of, for instance, CoCrPt and the first nonmagnetic film 113 may be constituted of Cr, Ta, TiW or the like.

The film thickness of the hard magnetic film 112a should be preferably set within a range of 5 to 50 nm. In addition, the film thickness of the first nonmagnetic film 113 included in the magnetic pole film should be preferably set within a range of 0.5 to 30 nm. It is desirable that the hard magnetic film 112a achieve a coercivity the level of which is within a range of $(500 \text{ to } 5000) \times 79.6$ (A/m).

Figure 6:
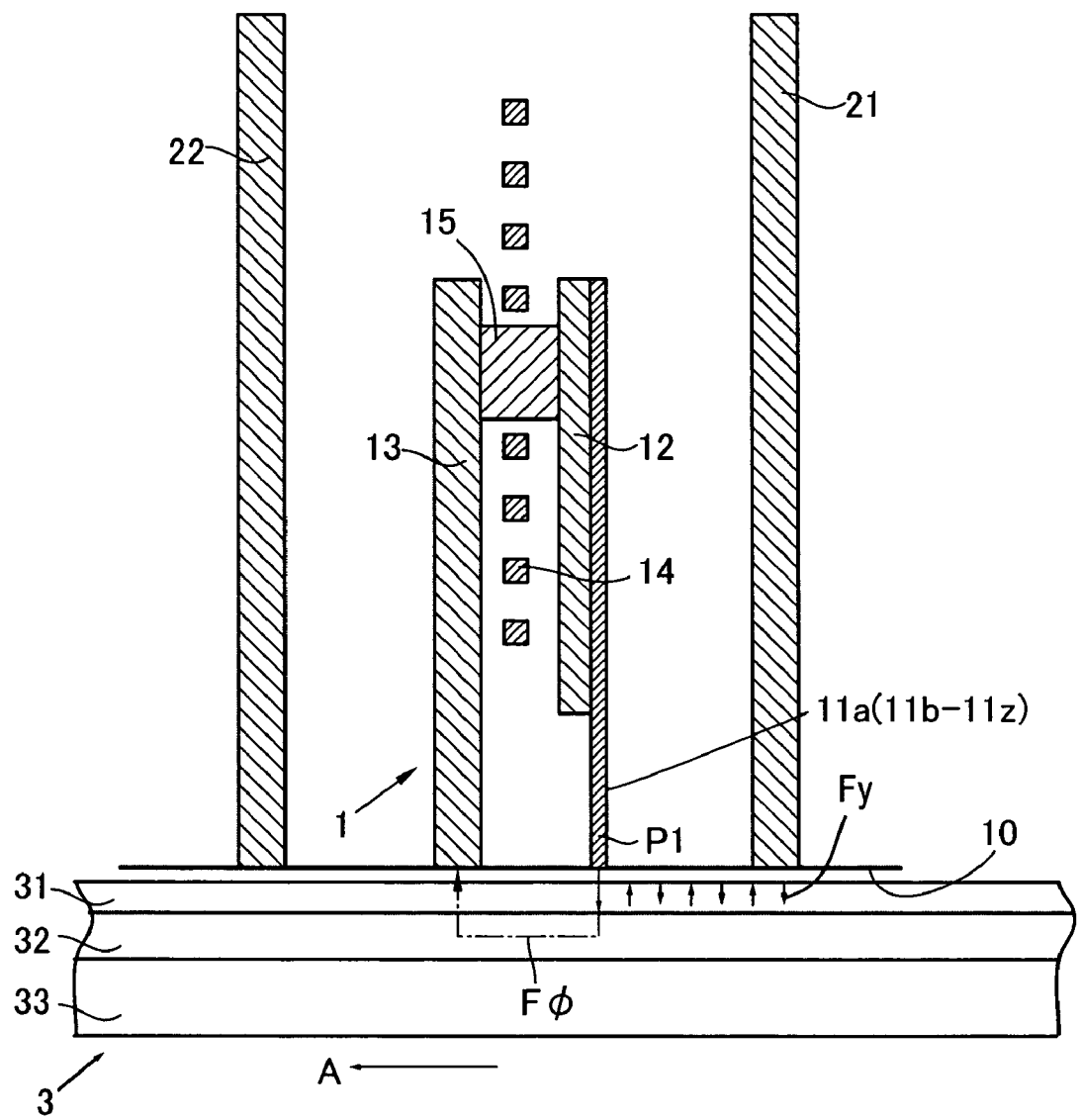
FIG. 6 illustrates the operation executed to write data through magnetic recording at a magnetic recording medium by using the magnetic recording element according to the present invention.

FIG. 6 illustrates the operation executed to write data at a magnetic recording medium 3 through perpendicular magnetic recording by using the magnetic recording element explained above. The writer magnetic pole film 11a at the magnetic recording element includes the soft magnetic film 111 assuming a hard axis Y along a direction of the perpendicular writer magnetic field and an easy axis X along the direction perpendicular to the direction of the perpendicular writer magnetic field and thus, the direction of the magnetization of the soft magnetic film 111 can be rotated from the direction extending along the easy axis X to the direction extending along the hard axis Y by supplying a write current to the coil film 14. The resulting writer magnetic field $F\phi$ can be used to apply a perpendicular magnetic field to the perpendicular magnetic recording medium 3.

The perpendicular magnetic recording medium 3 in the figure adopts a structure achieved by disposing a soft magnetic layer 32 over a substrate 33 and disposing a recording layer 31 over the soft magnetic layer 32. The writer magnetic field $F\phi$ generated through the magnetic pole end P1 at the pole portion of the magnetic pole film 11a passes through the recording layer 31 thereby magnetizing the 31 along the direction perpendicular to the film surface and further passes through the soft magnetic layer 32 before it is absorbed by the yoke film 13.

The writer magnetic pole film 11a at the perpendicular magnetic recording element according to the present invention includes the magnetic bias film which applies a magnetic bias along the easy axis X to the soft magnetic film 111. Thus, when a write operation is not executed, the soft magnetic film 111 receiving the magnetic bias applied from the magnetic bias film becomes magnetized with a high level of stability along the easy axis X, perpendicular to the direction of the perpendicular writer magnetic field. As a result, the problem of the pole erase phenomena attributable to the residual magnetic flux generated when a write operation is not executed can be eliminated with a high level of reliability by adopting the present invention.

The magnetic bias film in the magnetic pole film 11a shown in FIG. 4 includes the hard magnetic film 112a and the first nonmagnetic film 113 which is arranged between the hard magnetic film 112a and the soft magnetic film 111 so as to allow the static magnetic field F1 generated through the magnetization M1 of the hard magnetic film 112a to be applied to the soft magnetic film 111. The bias magnetic field is applied to the soft magnetic film 111 along the direction Fx which extends antiparallel to the direction of the magnetization M1 of the hard magnetic film 112a.

Figure 7:
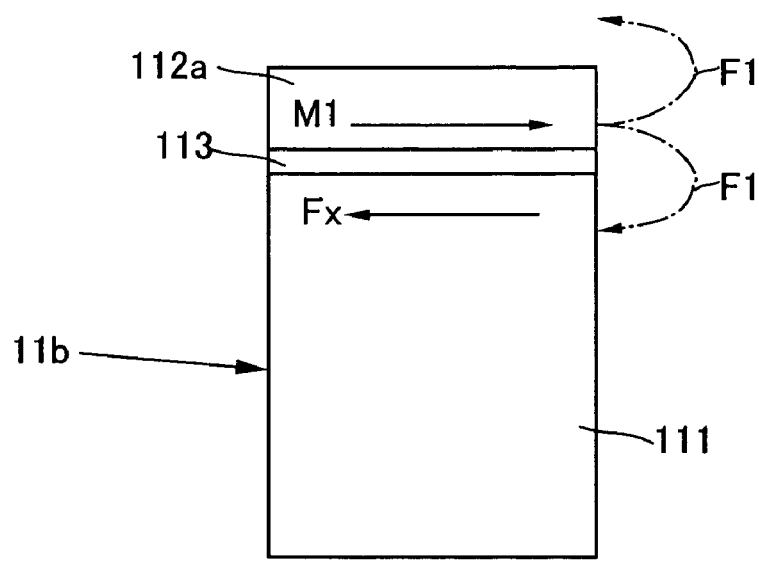
FIG. 7 shows a stacked film structure that may be adopted in the writer magnetic pole film.

FIG. 7 shows another film structure that may be adopted in a writer magnetic pole film 11b. The same reference numerals are assigned to components in FIG. 7 which correspond to the components in FIG. 4. In this embodiment, a stacked film constituted with the first nonmagnetic film 113 and the hard magnetic film 112a is set adjacent to the soft magnetic film 111 on the upper side surface.

Figure 8:
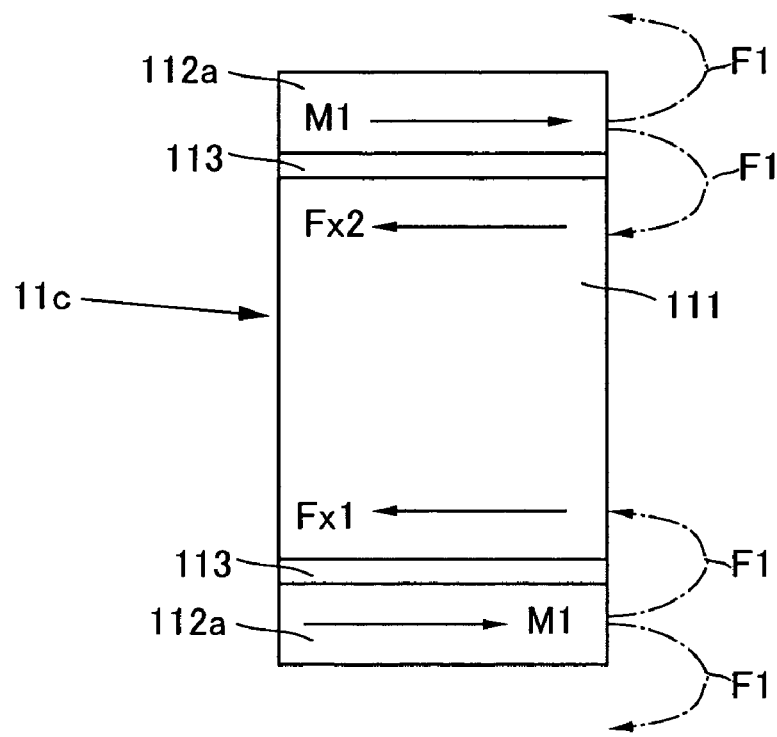
FIGS. 8 to 30 each show a stacked film structure that may be adopted in the magnetic pole film.

FIG. 8 shows also another film structure that may be adopted in a writer magnetic pole film 11c. In the figure, the same reference numerals are assigned to components corresponding to those in FIG. 4. In this embodiment, a stacked film constituted with the first nonmagnetic film 113 and the hard magnetic film 112a is arranged adjacent to the soft magnetic film 111 at two locations, i.e., on the bottom side surface and the upper side surface.

Figure 9:
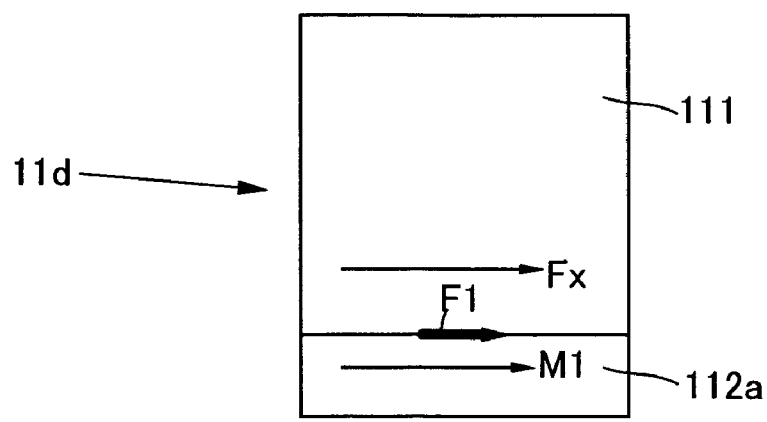

FIG. 9 also shows another film structure that may be adopted in a writer magnetic pole film 11d. In the figure, the same reference numerals are assigned to components corresponding to those in FIG. 4. In this embodiment, the hard magnetic film 112a is arranged adjacent to the soft magnetic film 111 so as to be exchange coupled with the soft magnetic film 111. An exchange coupling magnetic field F1 generated through the magnetic static coupling is used to apply a bias magnetic field to the soft magnetic film 111 along the direction Fx which matches the direction of the magnetization M1 of the hard magnetic film 112a.

Figure 10:
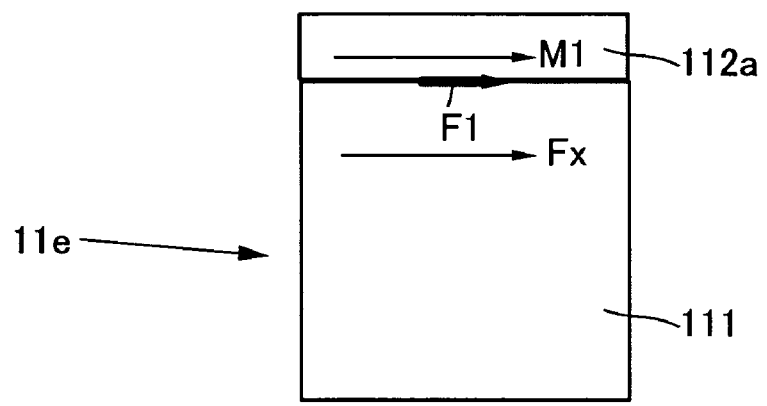

FIG. 10 shows the structure of a writer magnetic pole film 11e which may be used in the perpendicular magnetic recording element in the first mode. In the figure, the same reference numerals are assigned to components corresponding to those in FIG. 9. In this embodiment, the hard magnetic film is arranged adjacent to the soft magnetic film 111 on the upper side surface so as to be exchange coupled. An exchange coupling magnetic field F1 generated through the magnetic static coupling is used to apply a bias magnetic field to the soft magnetic film 111 along the direction Fx which matches the direction of the magnetization M1 of the hard magnetic film 112a.

Figure 11:
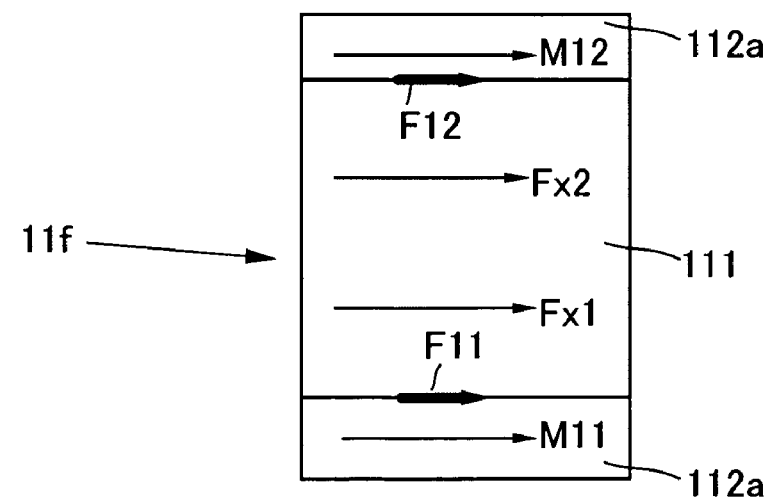

FIG. 11 shows the structure of a writer magnetic pole film 11f which may be used in the magnetic recording element in the first mode. In the figure, the same reference numerals are assigned to components corresponding to those in FIGS. 9 and 10. In this embodiment, the hard magnetic film 112 is arranged adjacent to the soft magnetic film 111 at two locations, i.e., on the bottom side surface and the upper side surface so as to be exchange coupled at the two positions. As a result, a bias magnetic field is applied to the soft magnetic film 111 from above and from below, along the directions Fx1 and Fx2 with a magnetic static coupling magnetic field F11 resulting from the magnetic static coupling achieved on the bottom side surface and a magnetic static coupling magnetic field F12 resulting from the magnetic static coupling achieved on the upper side surface.

2. Second Mode

FIGS. 12 to 17 are each an end surface view showing the structure of a writer magnetic pole film 11g, 11h, 11i, 11j, 11k, or 11m that may be used in the perpendicular recording element in the second mode. In the first example presented in FIG. 12, the magnetic bias film includes the first nonmagnetic film 113. The first nonmagnetic film 113 is arranged between a stacked film constituted with a first ferromagnetic film 112b and a first antiferromagnetic film 114, and a soft magnetic film 111. In this structure, a magnetic static coupling magnetic field Hex1 resulting from the magnetic static coupling of the first ferromagnetic film 112b and the first antiferromagnetic film 114 enables the ferromagnetic film 112b to act as if they were a hard magnetic film. Then, a static magnetic field F1 generated through the magnetization M1 of the ferromagnetic film 112b is applied to the soft magnetic film 111. A bias magnetic field is applied to the soft magnetic film 111 along the direction Fx which extends antiparallel to the magnetization M1.

Figure 13:
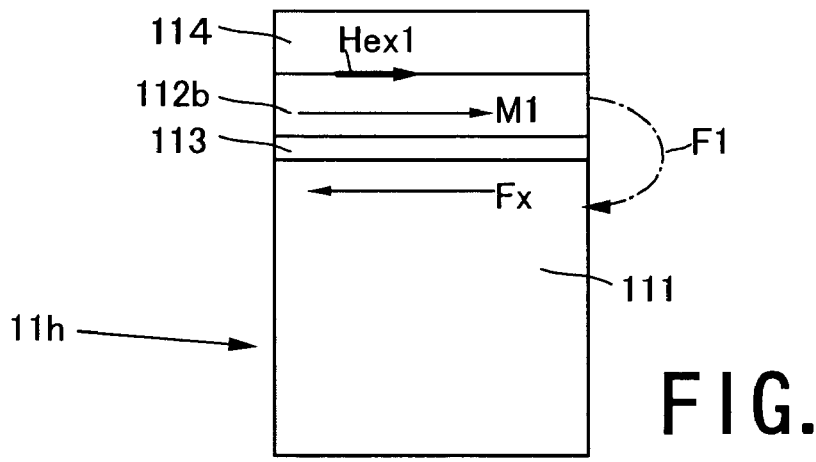

In the embodiment shown in FIG. 13, the magnetic bias film is arranged on the upper side surface of the soft magnetic film 111. In this structure, too, a magnetic static coupling magnetic field Hex1 resulting from the magnetic static coupling of the first ferromagnetic film 112b and the first antiferromagnetic film 114 enables the ferromagnetic film 112b to act as if they were a hard magnetic film. Then, a static magnetic field F1 generated through the magnetization M1 of the ferromagnetic film 112b is applied to the soft magnetic film 111. A bias magnetic field is applied to the soft magnetic film 111 along the direction Fx which extends antiparallel to the direction of the magnetization M1.

Figure 14:
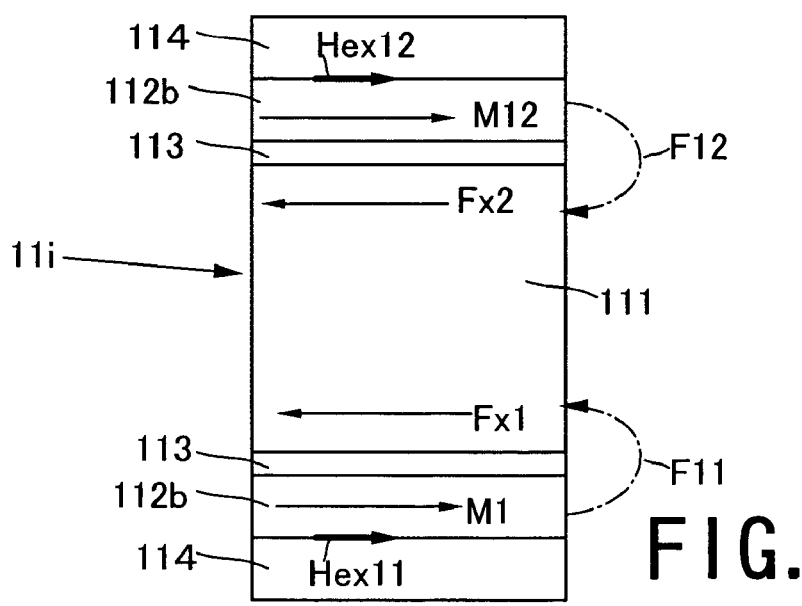

In the embodiment shown in FIG. 14, the magnetic bias film is arranged both on the bottom side surface and on the upper side surface of the soft magnetic film 111. When this structure is adopted, a magnetic static coupling magnetic field Hex11 generated through the magnetic static coupling of the first ferromagnetic film 112b and the first antiferromagnetic film 114 present on the bottom side surface of the soft magnetic film 111 allows the ferromagnetic film 112b to act as if they were a hard magnetic film. A static magnetic field F11 generated through the magnetization M11 of the ferromagnetic film 112b is then applied to the soft magnetic film 111. A bias magnetic field is applied to the soft magnetic film 111 along the direction Fx1 which extends antiparallel to the direction of the magnetization M11. In addition, a magnetic static coupling magnetic field Hex12 generated through the magnetic static coupling of the first ferromagnetic film 112b and the first antiferromagnetic film 114 present on the upper side surface of the hard magnetic film 112 allows the ferromagnetic film 112b to act as if they were a hard magnetic film. A static magnetic field F12 generated through the magnetization M12 of the ferromagnetic film 112b is then applied to the soft magnetic film 111. A bias magnetic field is applied to the soft magnetic film 111 along the direction Fx2 antiparallel to the direction of the magnetization M12.

Figure 15:
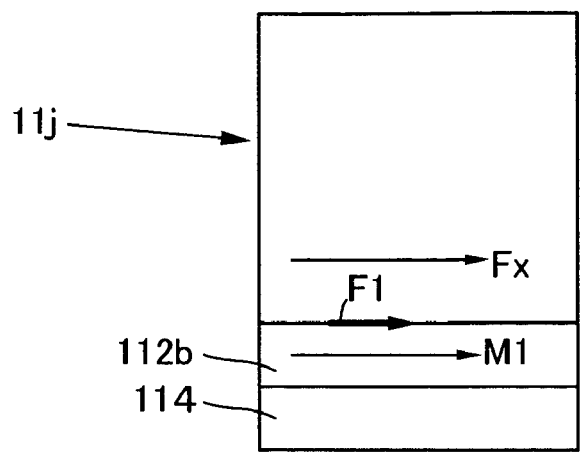

In the embodiment illustrated in FIG. 15, a stacked film constituted with the first ferromagnetic film 112b and the first antiferromagnetic film 114 is arranged adjacent to the soft magnetic film 111. In this structure, a magnetic static coupling magnetic field F1 resulting from the magnetic static coupling of the first ferromagnetic film 112b and the first antiferromagnetic film 114 is used to apply a bias magnetic field to the soft magnetic film 111 along the direction Fx which extends parallel to the magnetization M1 of the ferromagnetic film 112b.

Figure 16:
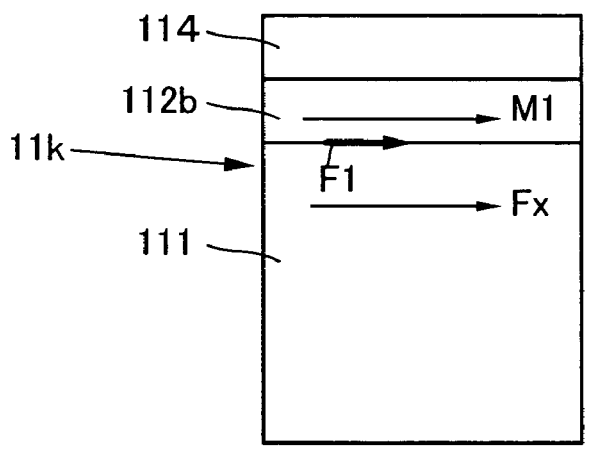

The magnetic bias film achieved in the embodiment shown in FIG. 16 is arranged on the upper side surface of the soft magnetic film 111. In this structure, too, a magnetic static coupling magnetic field F1 generated through the magnetic static coupling of the first ferromagnetic film 112b and the first antiferromagnetic film 114 is used to apply a bias magnetic field to the soft magnetic film 111 along the direction Fx extending parallel to the direction of the magnetization M1 of the ferromagnetic film 112b.

Figure 17:
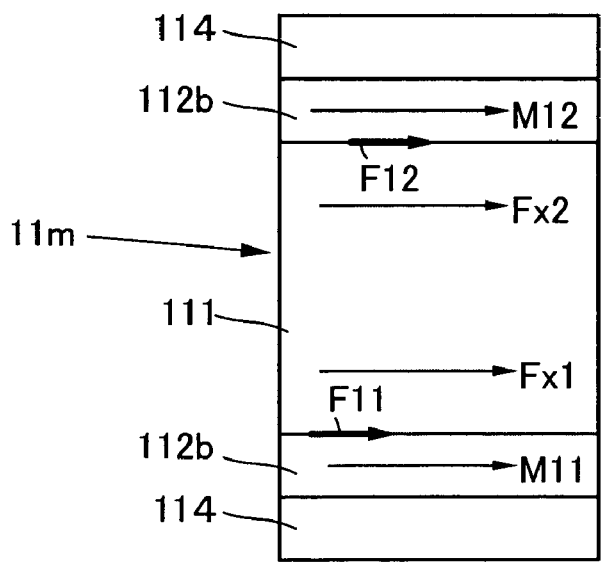

In the embodiment shown in FIG. 17, the magnetic bias film is arranged both on the bottom side surface and on the upper side surface of the soft magnetic film 111. In this structure, a magnetic static coupling magnetic field F11 generated through the magnetic static coupling of the first ferromagnetic film 112b and the first antiferromagnetic film 114 located on the bottom side surface of the soft magnetic film 111 is used to apply a bias magnetic field along the direction Fx1 extending parallel to the direction of the magnetization M11 of the ferromagnetic film 112b, and a magnetic static coupling magnetic field F12 generated through the magnetic static coupling of the first ferromagnetic film 112b and the first antiferromagnetic film 114 located on the upper side surface of the soft magnetic film 111 is used to apply a bias magnetic field along the direction Fx2 extending parallel to the direction of the magnetization M12 of the ferromagnetic film 112b.

When adopting the second mode, it is desirable to set the film thickness of the first antiferromagnetic film 114 within a range of 3 to 50 nm, the film thickness of the first ferromagnetic film 112b within a range of 1 to 20 nm and the film thickness of the first nonmagnetic film 113 within a range of 0.5 to 30 nm.

The first antiferromagnetic film 114 may be constituted of NiMn, IrMn, PtMn, NiO, $\alpha$-Fe$_2$O$_3$ or the like. The first ferromagnetic film 112b may be constituted of NiFe, CoFe, CoNiFe or the like.

3. Third Mode

Figure 18:
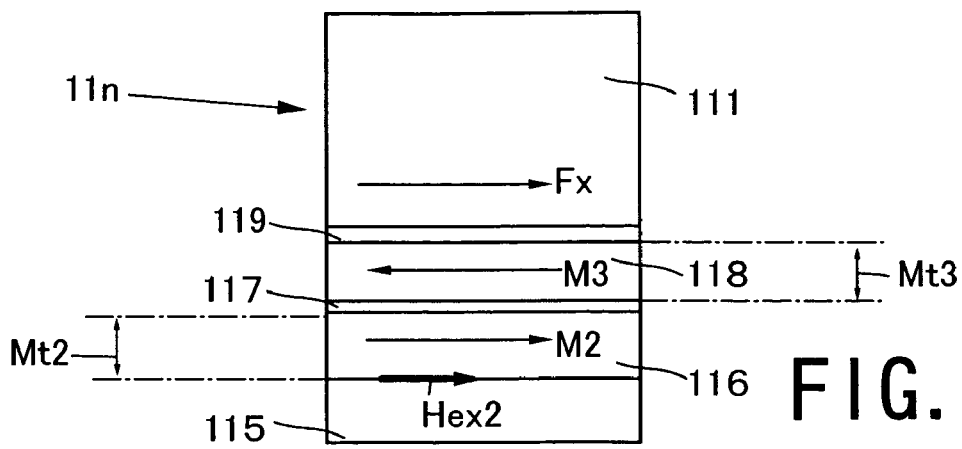

FIGS. 18 through 23 are end surface views showing the structures adopted in writer magnetic pole films 11n, 11o, 11p, 11q, 11r and 11s, any of which may be included in the perpendicular recording element adopting the third mode. The magnetic bias film in the embodiment shown in FIG. 18 is arranged on the bottom side surface of the soft magnetic film 111. The magnetic bias film includes a second antiferromagnetic film 115, a second ferromagnetic film 116, a first spacer film 117, a third ferromagnetic film 118 and a second nonmagnetic film 119. The second antiferromagnetic film 115 and the second ferromagnetic film 116 are stacked so as to be exchange coupled. The first spacer film 117 is arranged between the stacked film constituted with the second antiferromagnetic film 115 and the second ferromagnetic film 116, and the third ferromagnetic film 118. The second nonmagnetic film 119 is arranged between the third ferromagnetic film 118 and the soft magnetic film 111.

It is generally known that when a ferromagnetic layer and a nonmagnetic metal layer constituted of Ru, Rh Cu or the like are arranged on top of each other to create a exchange coupling, the layer thickness of the nonmagnetic metal layers induces an interaction of the ferromagnetic layers which results in a ferromagnetic (parallel magnetization) or antiferromagnetic (antiparallel magnetization) coupling. If the ferromagnetic layers are coupled antiferromagnetically, a particularly high level of exchange coupling energy is achieved.

In the embodiment described above, the magnetization of the second ferromagnetic film 116 and the magnetization of the third ferromagnetic film 118 are coupled antiferromagnetically via the first spacer film 117, and thus, the second ferromagnetic film 116 and the third ferromagnetic film 118 are magnetized along directions antiparallel to each other.

Since the second ferromagnetic film 116 and the second antiferromagnetic film 115 in the same structure achieve a magnetic static coupling through their exchange coupling magnetic field Hex2, the second ferromagnetic film 116 and the third ferromagnetic film 118 antiferromagnetically coupled via the spacer film 117 act as if they were a hard magnetic film. By ensuring that the level of the magnetization of the second ferromagnetic film 116 and the level of the magnetization of the third ferromagnetic film 118 are not equal to each other, a bias magnetic field can be applied to the soft magnetic film 111 along the direction Fx with the magnetization ΔM attributable to the difference (|M2−M3|) of the magnetization M2 of the second ferromagnetic film 116 and the magnetization M3 of the third ferromagnetic film 118. By adopting this structure, it becomes possible to apply a more stable bias magnetic field to the soft magnetic film 111.

Figure 19:
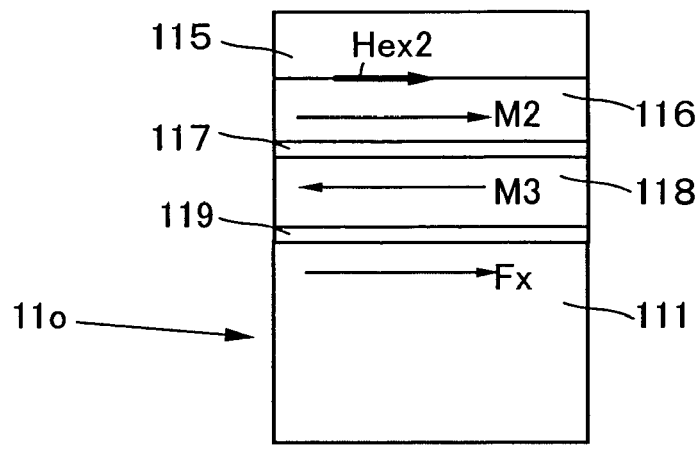

The magnetic bias film in the embodiment shown in FIG. 19 is arranged on the upper side surface of the soft magnetic film 111. In this structure, too, the magnetization of the second ferromagnetic film 116 and the magnetization of the third ferromagnetic film 118 are coupled antiferromagnetically via the first spacer film 117, and thus, the second ferromagnetic film 116 and the third ferromagnetic film 118 are magnetized along directions antiparallel to each other. Since the second ferromagnetic film 116 and the second antiferromagnetic film 115 in the same structure achieve a magnetic static coupling through their exchange coupling magnetic field Hex2, the second ferromagnetic film 116 and the third ferromagnetic film 118 antiferromagnetically coupled via the spacer film 117 act as if they were a hard magnetic film. By ensuring that the level of the magnetization of the second ferromagnetic film 116 and the level of the magnetization of the third ferromagnetic film 118 are not equal to each other, a bias magnetic field can be applied to the soft magnetic film 111 along the direction Fx with the magnetization ΔM attributable to the difference (|M2·M3|) of the magnetization M2 of the second ferromagnetic film 116 and the magnetization M3 of the third ferromagnetic film 118.

Figure 20:
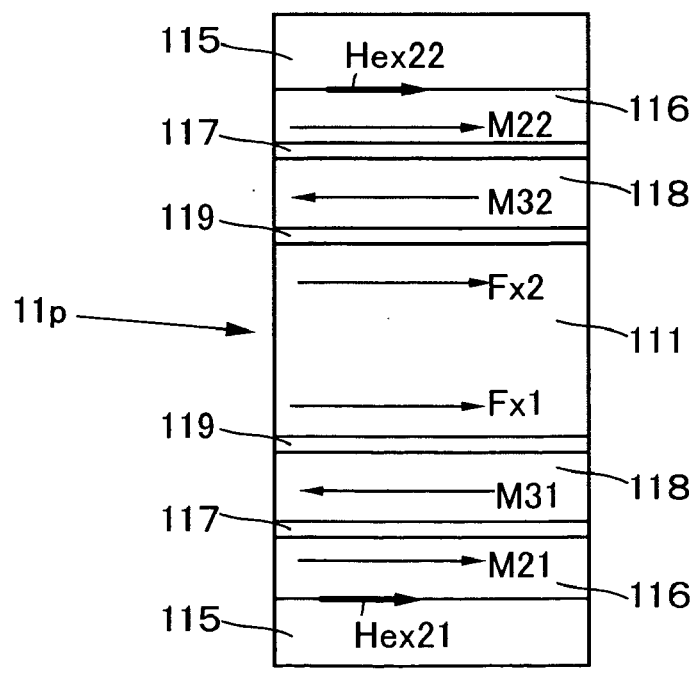

The magnetic bias film in the embodiment shown in FIG. 20 is arranged both on the bottom side surface and on the upper side surface of the soft magnetic film 111. The magnetization of the second ferromagnetic film 116 and the magnetization of the third ferromagnetic film 118 arranged on the bottom side surface of the soft magnetic film 111 are coupled antiferromagnetically via the first spacer film 117, and thus, the second ferromagnetic film 116 and the third ferromagnetic film 118 are magnetized along directions antiparallel to each other. Since the second ferromagnetic film 116 and the second antiferromagnetic film 115 in the same structure achieve a magnetic static coupling through their exchange coupling magnetic field Hex21, the second ferromagnetic film 116 and the third ferromagnetic film 118 antiferromagnetically coupled via the spacer film 117 act as if they were a hard magnetic film. By ensuring that the level of the magnetization of the second ferromagnetic film 116 and the level of the magnetization of the third ferromagnetic film 118 are not equal to each other, a bias magnetic field can be applied to the soft magnetic film 111 along the direction Fx1 with the magnetization ΔM1 attributable to the difference (|M2−M3|) of the magnetization M21 of the second ferromagnetic film 116 and the magnetization M31 of the third ferromagnetic film 118. At the same time, the magnetization of the second ferromagnetic film 116 and the magnetization of the third ferromagnetic film 118 arranged on the upper side surface of the soft magnetic film 111 are coupled antiferromagnetically via the first spacer film 117, and thus, the second ferromagnetic film 116 and the third ferromagnetic film 118 are magnetized along directions antiparallel to each other. Since the second ferromagnetic film 116 and the second antiferromagnetic film 115 in the same structure achieve a magnetic static coupling through their exchange coupling magnetic field Hex22, the second ferromagnetic film 116 and the third ferromagnetic film 118 antiferromagnetically coupled via the spacer film 117 act as if they were a hard magnetic film. By ensuring that the level of the magnetization of the second ferromagnetic film 116 and the level of the magnetization of the third ferromagnetic film 118 are not equal to each other, a bias magnetic field can be applied to the soft magnetic film 111 along the direction Fx2 with the magnetization ΔM2 attributable to the difference (|M22−M32|) of the magnetization M22 of the second ferromagnetic film 116 and the magnetization M32 of the third ferromagnetic film 118.

Figure 21:
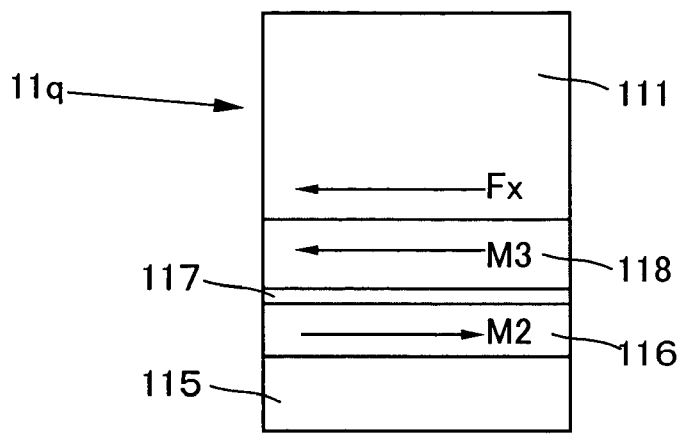

The magnetic bias film in the embodiment shown in FIG. 21 is arranged on the bottom side surface of the soft magnetic film 111. The magnetic bias film includes a second antiferromagnetic film 115, a second ferromagnetic film 116, a first spacer film 117 and a third ferromagnetic film 118. The second antiferromagnetic film 115 and the second ferromagnetic film 116 are stacked so as to be exchange coupled. The first spacer film 117 is arranged between the stacked film constituted with the second antiferromagnetic film 115 and the second ferromagnetic film 116, and the third ferromagnetic film 118. The third ferromagnetic film 118 is arranged directly adjacent to the soft magnetic film 111.

In this structure, the third ferromagnetic film 118 and the soft magnetic film 111 arranged adjacent to each other are ferromagnetically coupled. Thus, a bias magnetic field generated along the direction Fx matching the direction of the magnetization M3 of the third ferromagnetic film 118 is applied to the soft magnetic film.

Figure 22:
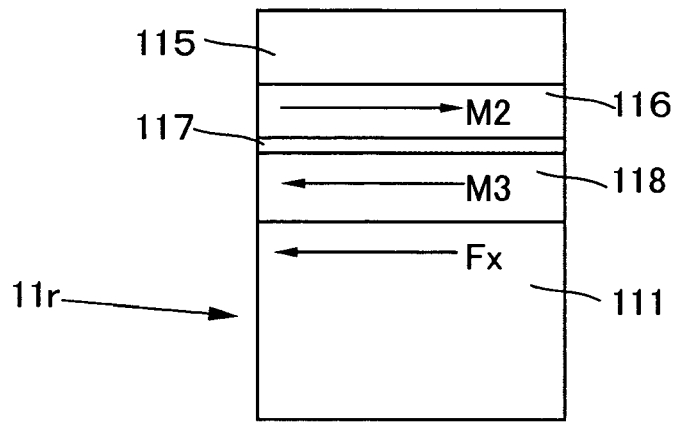

The magnetic bias film in the embodiment shown in FIG. 22 is arranged on the upper side surface of the soft magnetic film 111. In this structure, too, the third ferromagnetic film 118 and the soft magnetic film 111 arranged adjacent to each other are ferromagnetically coupled. Thus, a bias magnetic field generated along the direction Fx matching the direction of the magnetization M3 of the third ferromagnetic film 118 is applied to the soft magnetic film 111.

Figure 23:
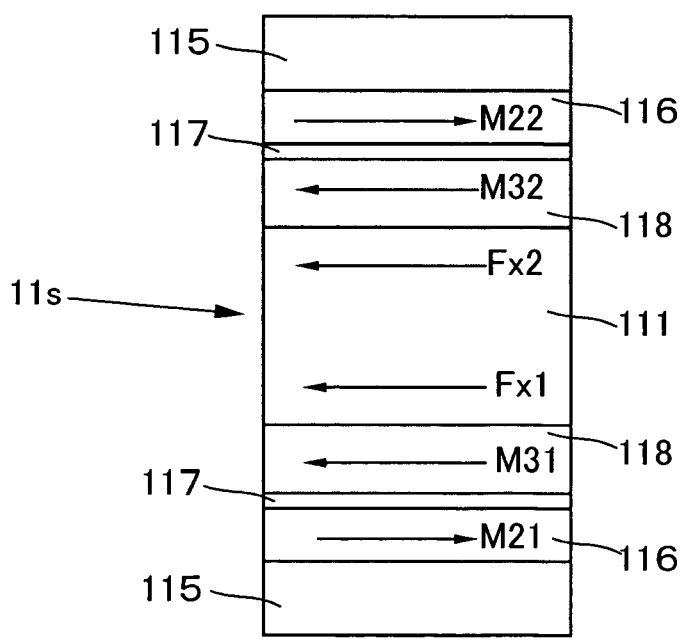

The magnetic bias film is arranged both on the bottom side surface and on the upper side surface of the soft magnetic film 111 in the embodiment shown in FIG. 23. As a result, a bias magnetic field generated along the direction Fx1 matching the direction of the magnetization M31 of the third ferromagnetic film 118 arranged on the bottom side surface is applied to the soft magnetic film and a bias magnetic field generated along the direction Fx2 matching the direction of the magnetization M32 of the third ferromagnetic film 118 arranged on the upper side is applied to the soft magnetic film.

When the third mode is adopted, it is desirable to set the film thickness of the second antiferromagnetic film 115 within a range of 3 to 50 nm. In addition, it should be ensured that the magnetic film thickness Mt2 of the second ferromagnetic film 116 and the magnetic film thickness Mt3 of the third ferromagnetic film 118 (see FIG. 18) are not equal to each other and satisfy a relationship expressed as; |Mt2−Mt3|=5 to 100 (T−nm). The film thickness of the first spacer film should be set equal to or smaller than 2 nm and preferably equal to or smaller than 1 nm. It is also desirable to set the film thickness of the second nonmagnetic film 119 within a range of 0.5 to 10 nm.

4. Fourth Mode

Figure 24:
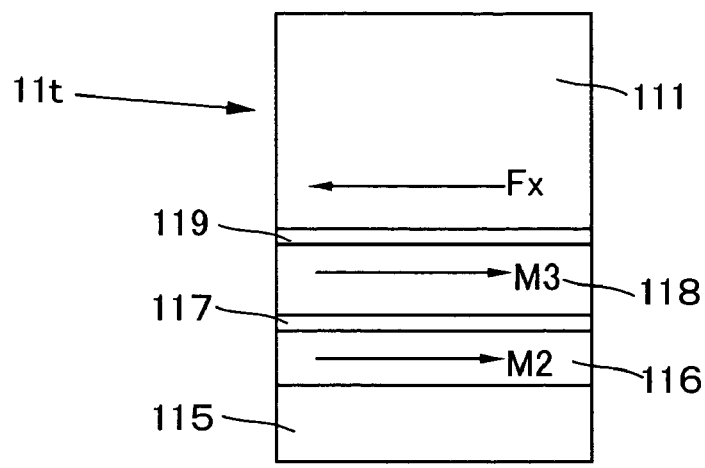

FIGS. 24 through 29 are end surface views showing the structures adopted in magnetic pole films 11t, 11u, 11v, 11w, 11x and 11y, any of which may be included in the perpendicular recording element adopting the fourth mode. The magnetic bias film in the embodiment shown in FIG. 24 is arranged on the bottom side surface of the soft magnetic film 111. The magnetic bias film includes a second antiferromagnetic film 115, a second ferromagnetic film 116, a first spacer film 117, a third ferromagnetic film 118 and a second nonmagnetic film 119. The second antiferromagnetic film 115 and the second ferromagnetic film 116 are stacked so as to be exchange coupled. The first spacer film 117 is arranged between the stacked film constituted with the second antiferromagnetic film 115 and the second ferromagnetic film 116, and the third ferromagnetic film 118. The second nonmagnetic film 119 is arranged between the third ferromagnetic film 118 and the soft magnetic film 111.

In the embodiment described above, the magnetization of the second ferromagnetic film 116 and the magnetization of the third ferromagnetic film 118 are coupled ferromagnetically via the first spacer film 117, and thus, the second ferromagnetic film 116 and the third ferromagnetic film 118 are magnetized along directions antiparallel to each other. Since the second ferromagnetic film 116 and the second antiferromagnetic film 115 in the same structure create an exchange coupling through their exchange coupling magnetic field Hex2, the second ferromagnetic film 116 and the third ferromagnetic film 118 ferromagnetically couple via the spacer film 117 act as if they were a hard magnetic film. In this structure, the level of the magnetization of the second ferromagnetic film 116 and the level of the magnetization of the third ferromagnetic film 118 may be equal to each other or the levels of their magnetizations may be different from each other. When the second ferromagnetic film 116 and the second ferromagnetic film 118 are ferromagnetically coupled, a bias magnetic field is applied to the soft magnetic film 111 along the direction Fx due to the total magnetization representing the sum (M2+M3) of the magnetization M2 of the second ferromagnetic film 116 and the magnetization M3 of the third ferromagnetic film 118. By adopting this structure, it becomes possible to apply an even more stable bias magnetic field to the soft magnetic film 111.

Figure 25:
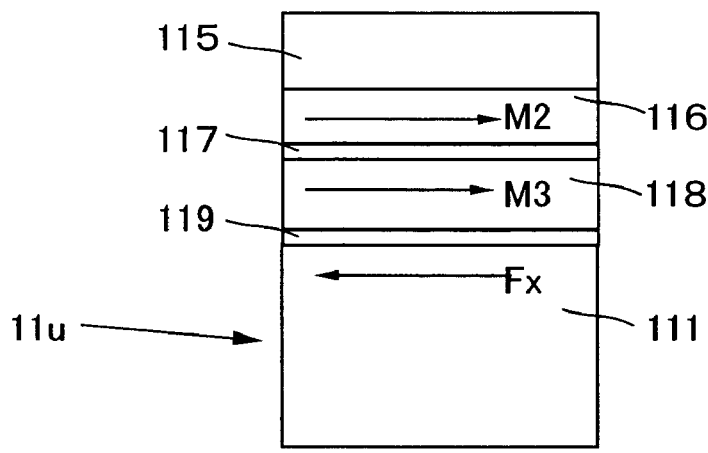

The magnetic bias film in the embodiment shown in FIG. 25 is arranged on the upper side surface of the soft magnetic film 111. In this structure, too, the magnetization of the second ferromagnetic film 116 and the magnetization of the third ferromagnetic film 118 are coupled ferromagnetically via the first spacer film 117, and thus, the second ferromagnetic film 116 and the third ferromagnetic film 118 are magnetized along directions antiparallel to each other. Since the second ferromagnetic film 116 and the second antiferromagnetic film 115 in the same structure achieve an exchange coupling through their exchange coupling magnetic field Hex2, the second ferromagnetic film 116 and the third ferromagnetic film 118 ferromagnetically couple via the spacer film 117 act as if they were a hard magnetic film. In this structure, the level of the magnetization of the second ferromagnetic film 116 and a level of the magnetization of the third ferromagnetic film 118 may be equal to each other or the levels of their magnetization may be different from each other. When the second ferromagnetic film 116 and 118 are ferromagnetically coupled, a bias magnetic field is applied to the soft magnetic film 111 along the direction Fx due to the total magnetization representing the sum (M2+M3) of the magnetization M2 of the second ferromagnetic film 116 and the magnetization M3 of the third ferromagnetic film 118. By adopting this structure, it becomes possible to apply an even more stable bias magnetic field to the soft magnetic film 111.

Figure 26:
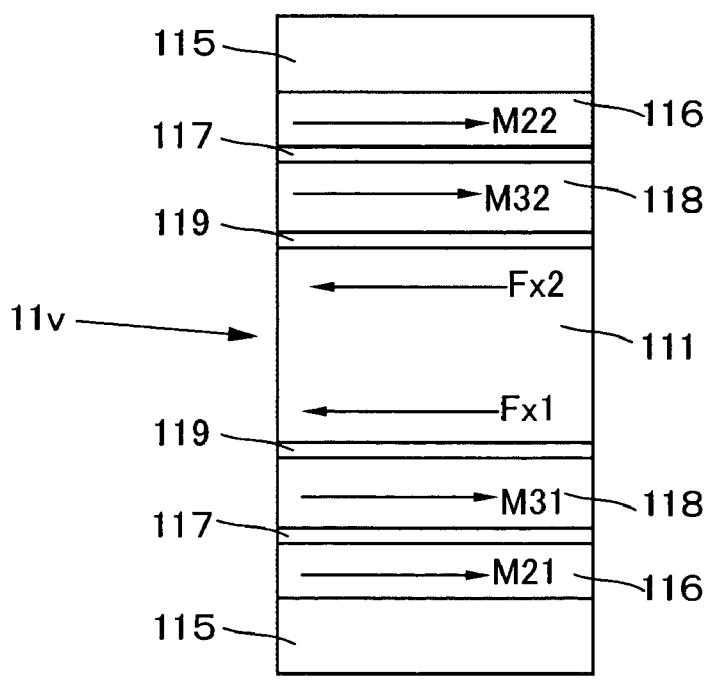

The magnetic bias film is arranged both on the bottom side surface and the upper side surface of the soft magnetic film 111 in the embodiment shown in FIG. 26. In this embodiment, the magnetization of the second ferromagnetic film 116 and the magnetization of the third ferromagnetic film 118 are coupled ferromagnetically via the first spacer film 117, and thus, the second ferromagnetic film 116 and the third ferromagnetic film 118 arranged on the bottom side are magnetized along directions antiparallel to each other. A bias magnetic field is applied to the soft magnetic film 111 along the direction Fx1 with the total magnetization representing the sum (M21+M31) of the magnetization M21 of the second ferromagnetic film 116 and the magnetization M31 of the third ferromagnetic film 118. At the same time, the magnetization of the second ferromagnetic film 116 and the magnetization of the third ferromagnetic film 118 on the upper side surface of the soft magnetic film are coupled ferromagnetically via the first spacer film 117, and thus, the second ferromagnetic film 116 and the third ferromagnetic film 118 arranged on the upper side are magnetized along directions antiparallel to each other. A bias magnetic field is applied to the soft magnetic film 111 along the direction Fx2 with the total magnetization representing the sum (M22+M32) of the magnetization M22 of the second ferromagnetic film 116 and the magnetization M32 of the third ferromagnetic film 118.

Figure 27:
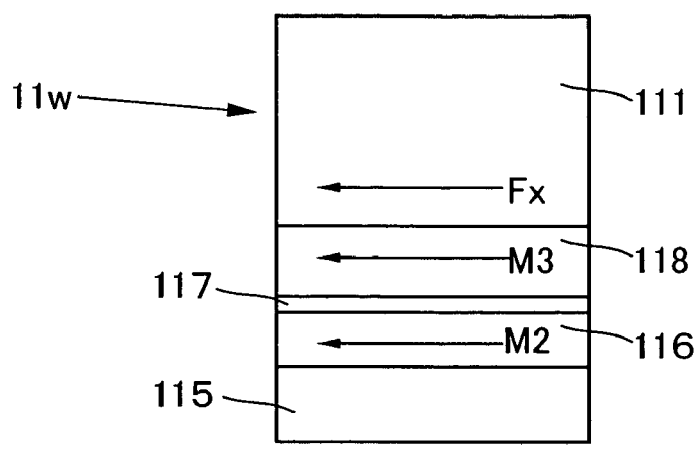

The magnetic bias film in the embodiment shown in FIG. 27 is arranged on the bottom side surface of the soft magnetic film 111. The magnetic bias film includes a second antiferromagnetic film 115, a second ferromagnetic film 116, a first spacer film 117 and a third ferromagnetic film 118. The second antiferromagnetic film 115 and the second ferromagnetic film 116 are stacked so as to be exchange coupled. The first spacer film 117 is arranged between the stacked film constituted with the second antiferromagnetic film 115 and the second ferromagnetic film 116, and the third ferromagnetic film 118. The third ferromagnetic film 118 is arranged directly adjacent to the soft magnetic film 111.

In this structure, the third ferromagnetic film 118 and the soft magnetic film 111 arranged adjacent to each other are also ferromagnetically coupled. Thus, a bias magnetic field generated along the direction Fx matching the direction of the magnetization M3 of the third ferromagnetic film 118 is applied to the soft magnetic film.

Figure 28:
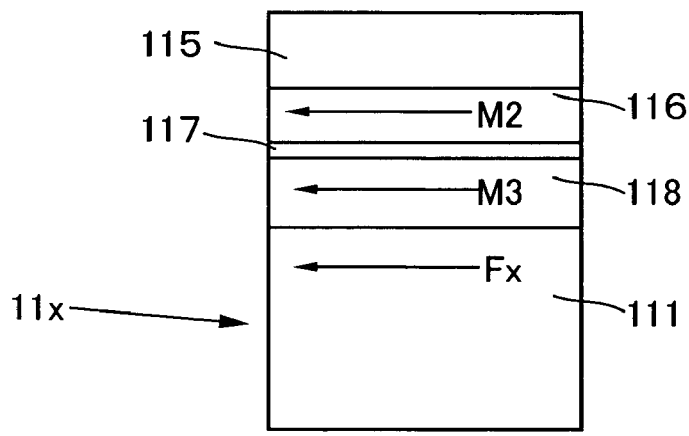

The magnetic bias film in the embodiment shown in FIG. 28 is arranged on the upper side surface of the soft magnetic film 111. In this structure, too, the third ferromagnetic film 118 and the soft magnetic film 111 arranged adjacent to each other are ferromagnetically coupled. Thus, a bias magnetic field generated along the direction Fx matching the direction of the magnetization M3 of the third ferromagnetic film 118 is applied to the soft magnetic film.

Figure 29:
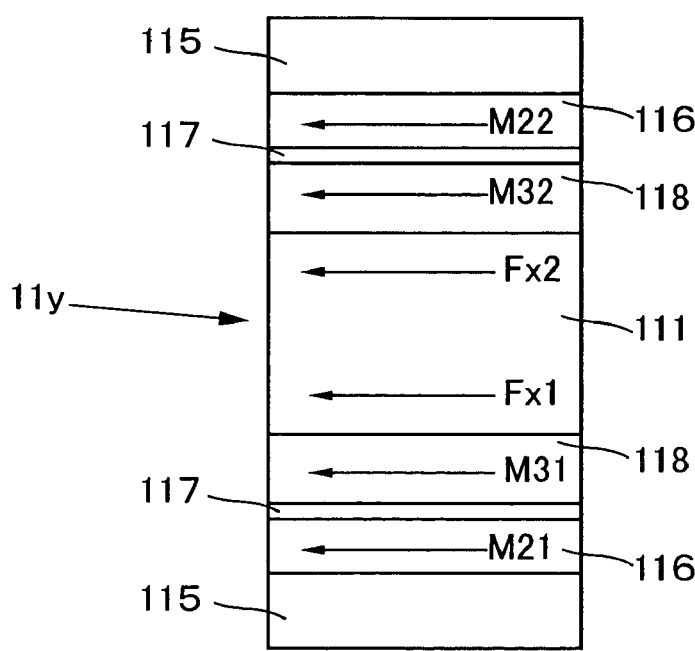

The magnetic bias film is arranged both on the bottom side surface and on the upper side surface of the soft magnetic film 111 in the embodiment shown in FIG. 29. As a result, a bias magnetic field generated along the direction Fx1 matching the direction of the magnetization M31 of the third ferromagnetic film 118 arranged on the bottom side surface is applied to the soft magnetic film and a bias magnetic field generated along the direction Fx2 matching the direction of the magnetization M32 of the third ferromagnetic film 118 arranged on the upper side is applied to the soft magnetic film on the upper side surface.

When the fourth mode is adopted, it is desirable to set the film thickness of the second antiferromagnetic film 115 within a range of 3 to 50 nm. In addition, while no specific restrictions are imposed with regard to the magnetic film thickness Mt2 of the second ferromagnetic film 116 and the magnetic film thickness Mt3 of the third ferromagnetic film 118, it should be ensured that the magnetic film thickness Mt2 of the second ferromagnetic film 116 and the magnetic film thickness Mt3 of the third ferromagnetic film 118 should be set within a range of 0.5 to 10 nm. The magnetic film thickness Mt3 of the third ferromagnetic film 118, it is desirable to set them within a range of 5 to 100 (T–nm) and more desirably, within a range of 5 to 50 (T–nm). The film thickness of the first spacer film should be set to or smaller than 2 nm, and equal to or greater than 1 nm. It is desirable to set the film thickness of the second nonmagnetic film 119 within a range of 0.5 to 10 (T·nm).

5. Fifth Mode

Figure 30:
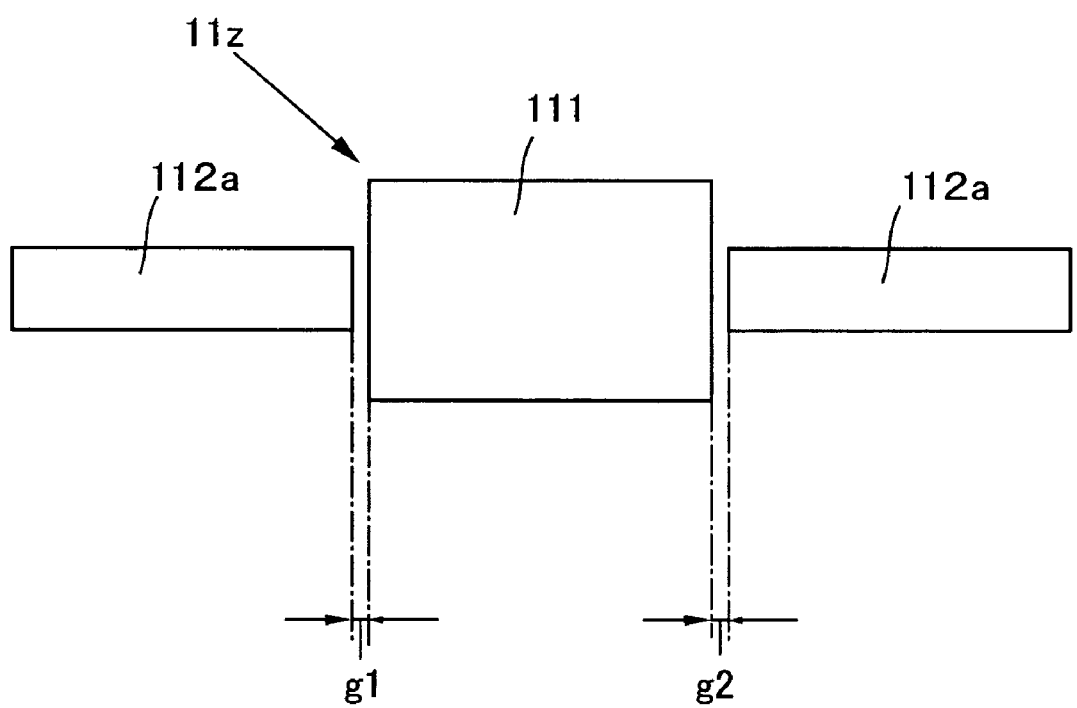

FIG. 30 is an end surface view showing the structure of a writer magnetic pole film 11z in the magnetic recording element adopting the fifth mode. The magnetic bias film achieved in the fifth mode includes two hard magnetic films 112a arranged at the ends of the soft magnetic film 111 on the two sides. The soft magnetic film 111 is magnetized with the hard magnetic films 112a arranged at the two side ends thereof.

It is desirable that the film thickness of the hard magnetic films 112a be equal to or less than half the film thickness of the soft magnetic film 111 and that the distances g1 and g2 between the soft magnetic film 111 and the hard magnetic films 112a be set within a range of 0 to 50 nm.

6. Thin-film Magnetic Head

Figure 31:
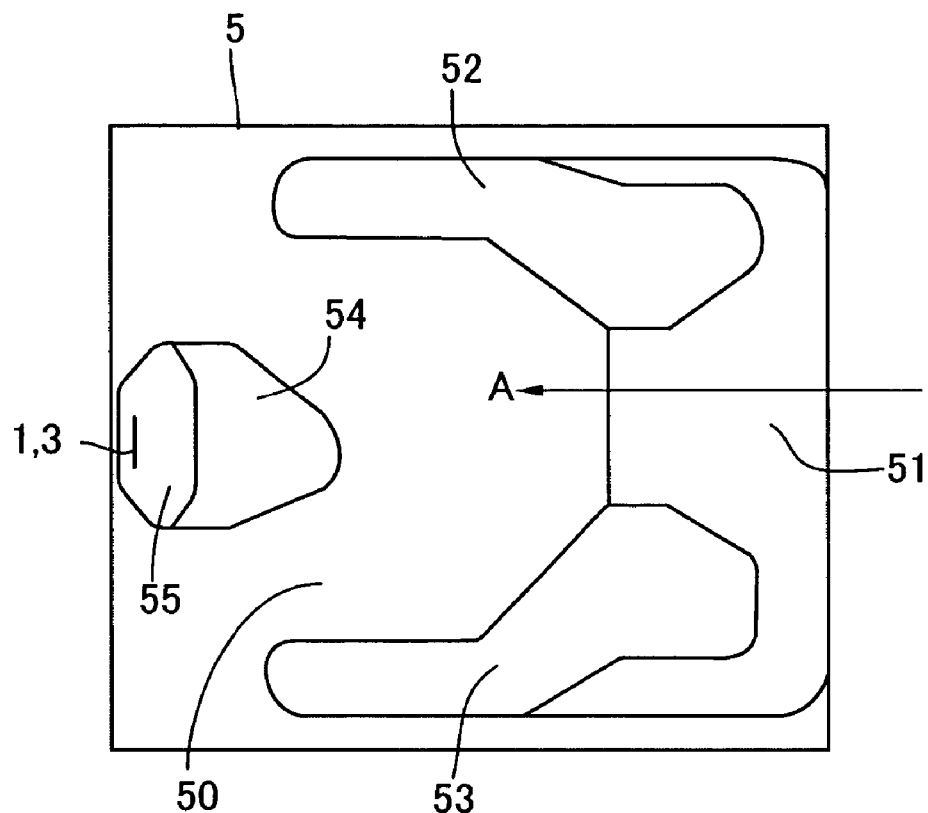
FIG. 31 is a top view of the thin film magnetic head according to the present invention, showing the side facing opposite the medium.
Figure 32:
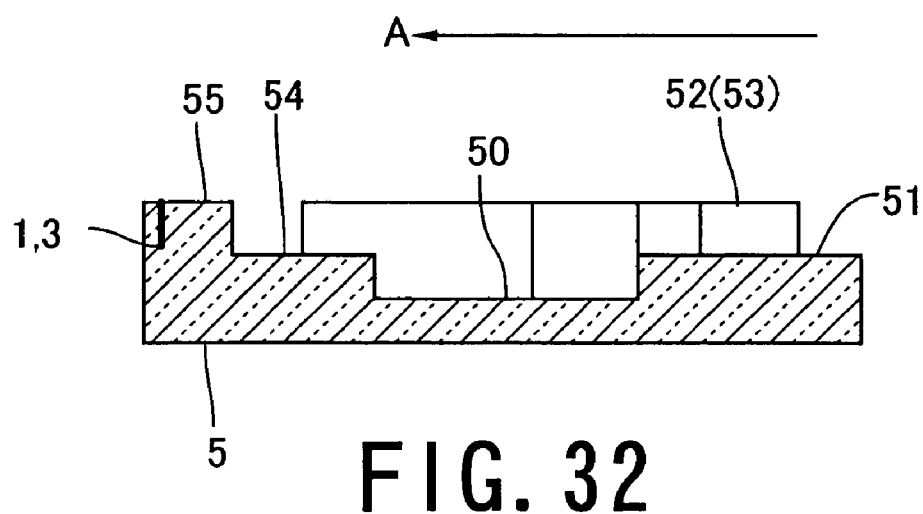
FIG. 32 is a cross-sectional front view of the thin film magnetic head in FIG. 31.
Figure 33:
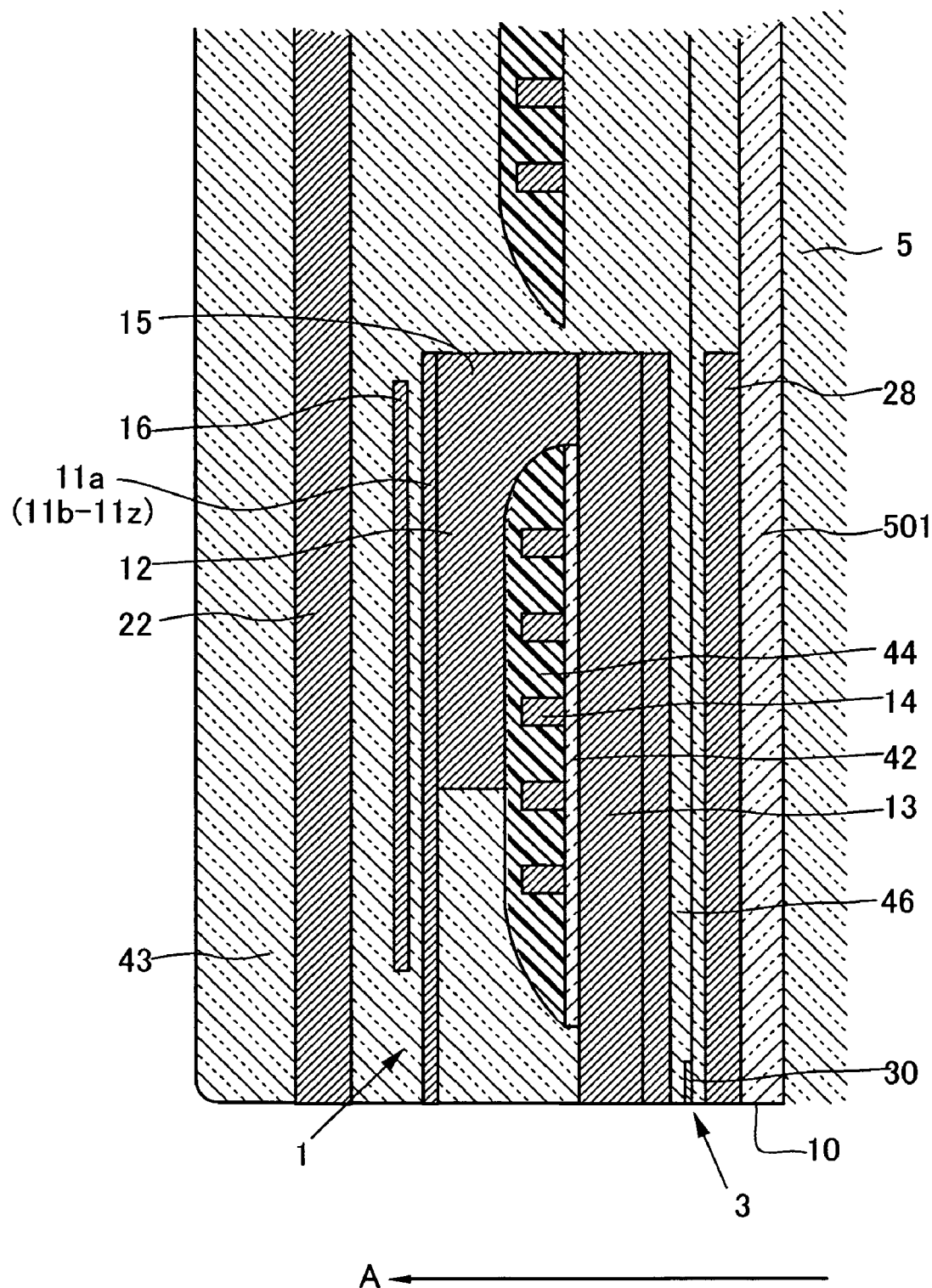
FIG. 33 is an enlarged sectional view of the portion of the thin film magnetic head shown in FIGS. 31 and 32, where its elements are arranged.

FIG. 31 is a plan view of the thin-film magnetic head according to the present invention showing the medium facing surface side, FIG. 32 is a sectional front view of the thin-film magnetic head in FIG. 31 and FIG. 33 is an enlarged sectional view of the portion of the thin-film magnetic head in FIGS. 31 and 32 where elements are arranged. In these figures, the dimensions, the proportions and the like are shown exaggerated or are not included so as to simplify the illustrations.

The thin-film magnetic head in the figures includes a slider base body 5 and electromagnetic conversion elements 1 and 3. The slider base body 5, which may be constituted of a ceramic material such as Altic ($Al_2O_3$—TiC), for instance, assumes a geometric form for floating characteristics control at its medium facing surface. As a typical example of such a geometric form, a first stage 51, a second stage 52, a third stage 53, a fourth stage 54 and a fifth stage 55 are formed at a bottom surface 50 of the slider base body 5 in the embodiment. At the bottom base surface 50, where a negative pressure is generated relative to the airflow direction, indicated by the arrow A, the second stage 52 and the third stage 53 constitute a stepped air bearing surface rising from the first stage 51. The surfaces of the second stage 52 and the third stage 53 form an ABS 10.

The fourth stage 54 rises in a step from the bottom base surface 50, and the fifth stage 55 rises in a step from the fourth stage 54. The electromagnetic conversion elements 1 and 3 are arranged at the fifth stage 55.

As shown in FIG. 33, an insulating film 501 is formed at an end surface of the slider base body 5. The insulating film 501 may be constituted of an insulating material such as aluminum oxide ($Al_2O_3$) or $SiO_2$ and has a thickness of 1 to 5 μm.

The magnetic recording/reproduction heads 1 and 3 include an MR element 3 constituting a reproducing element and a perpendicular magnetic recording element 1 used as a recording element. The MR element 3 constituting the reproducing element includes an GMR film or a TMR film.

The perpendicular magnetic recording element 1 is one of the perpendicular magnetic recording elements according to the present invention shown in FIGS. 1 through 30 having its writer magnetic pole end P1 set along the ABS 10. The perpendicular magnetic recording element 1 is arranged in close proximity to the MR element 3, and is covered with a protective film 43.

As explained earlier in reference to FIGS. 1 through 30, the perpendicular magnetic recording element 1 includes a writer magnetic pole film 11a (11b to 11z), an auxiliary magnetic pole film 12, a yoke film 15, a coil film 14, a first shield film 21, a second shield film 22 and an auxiliary magnetic pole 16. An end surface of the magnetic pole end P1 of the magnetic pole film 11a (11b to 11z) is positioned at the ABS 10. The coil film 14 is supported by an insulating film 42 and is arranged within an insulating film 44. The MR element 3 is arranged between the first shield film 21 constituting the perpendicular magnetic recording element 1 and the slider base body 5.

In the thin-film magnetic recording head according to the present invention having the magnetic recording element 1 explained in reference to FIGS. 1 through 30 used as a write element, the problem of the pole erase phenomena inherent to perpendicular magnetic recording can be eliminated.

Figure 34:
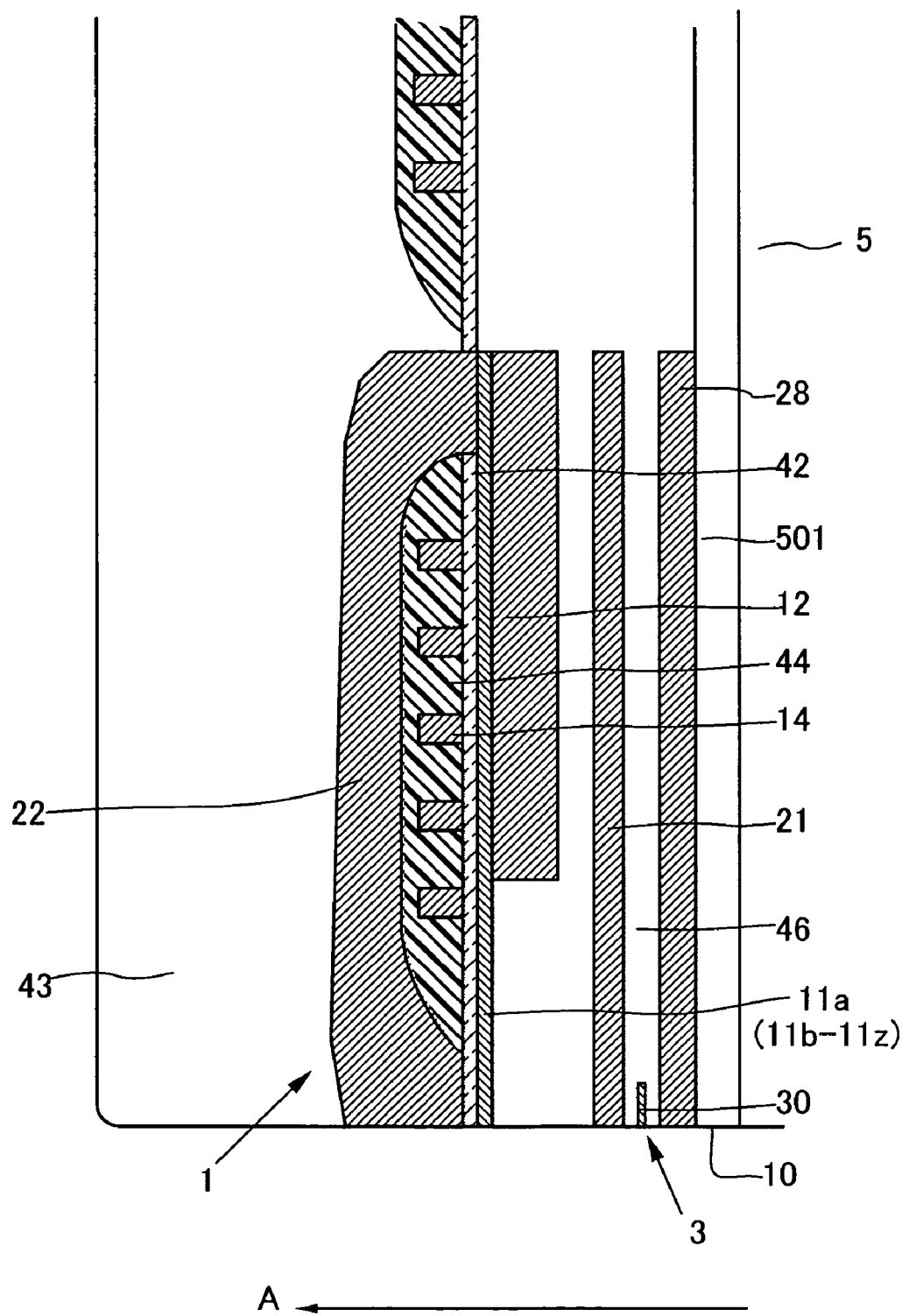
FIG. 34 shows a cross-sectional front view of the thin film magnetic head according to the present invention achieved in another embodiment.

FIG. 34 is a sectional front view of the thin-film magnetic head achieved in another embodiment of the present invention. In the figure, the same reference numerals are assigned to components corresponding to those in FIG. 33. In this embodiment, the second shield film 22 is formed over the insulating film 44 that insulates the area around the coil film 14. An insulating film constituted of an inorganic insulating material is formed in most of the unhatched blank areas.

Figure 35:
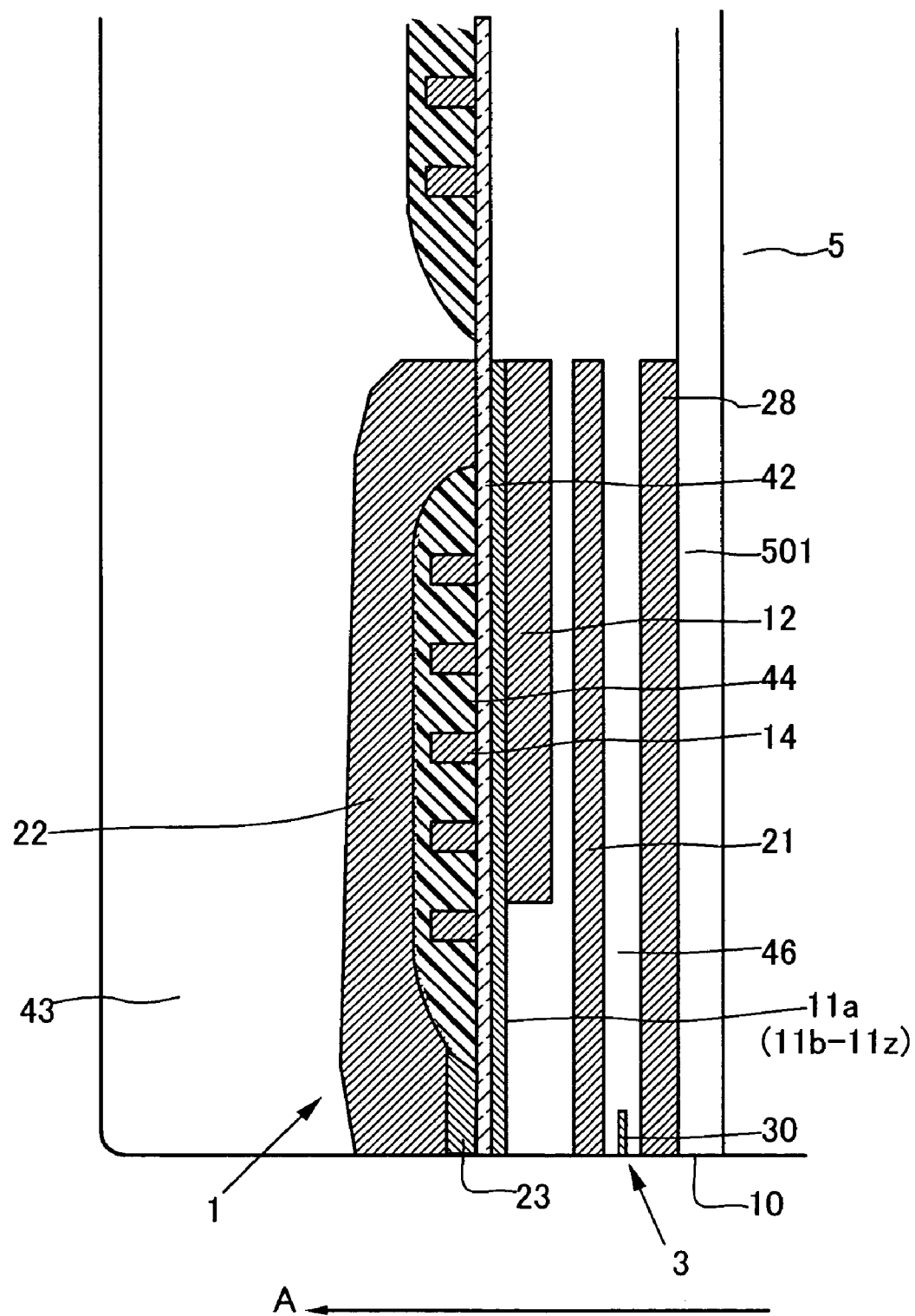
FIGS. 35 to 37 each show a cross-sectional front view of the thin film magnetic head according to the present invention achieved in yet another embodiment.

FIG. 35 is a sectional front view of the thin-film magnetic head achieved in yet another embodiment of the present invention. In the figure, the same reference numerals are assigned to components corresponding to those in FIGS. 33 and 34. In this embodiment, the second shield film 22 is formed over the insulating film 44 that insulates the area around the coil film 14 and an auxiliary magnetic film 23 is formed at the front end of the second shield film 22.

Figure 36:
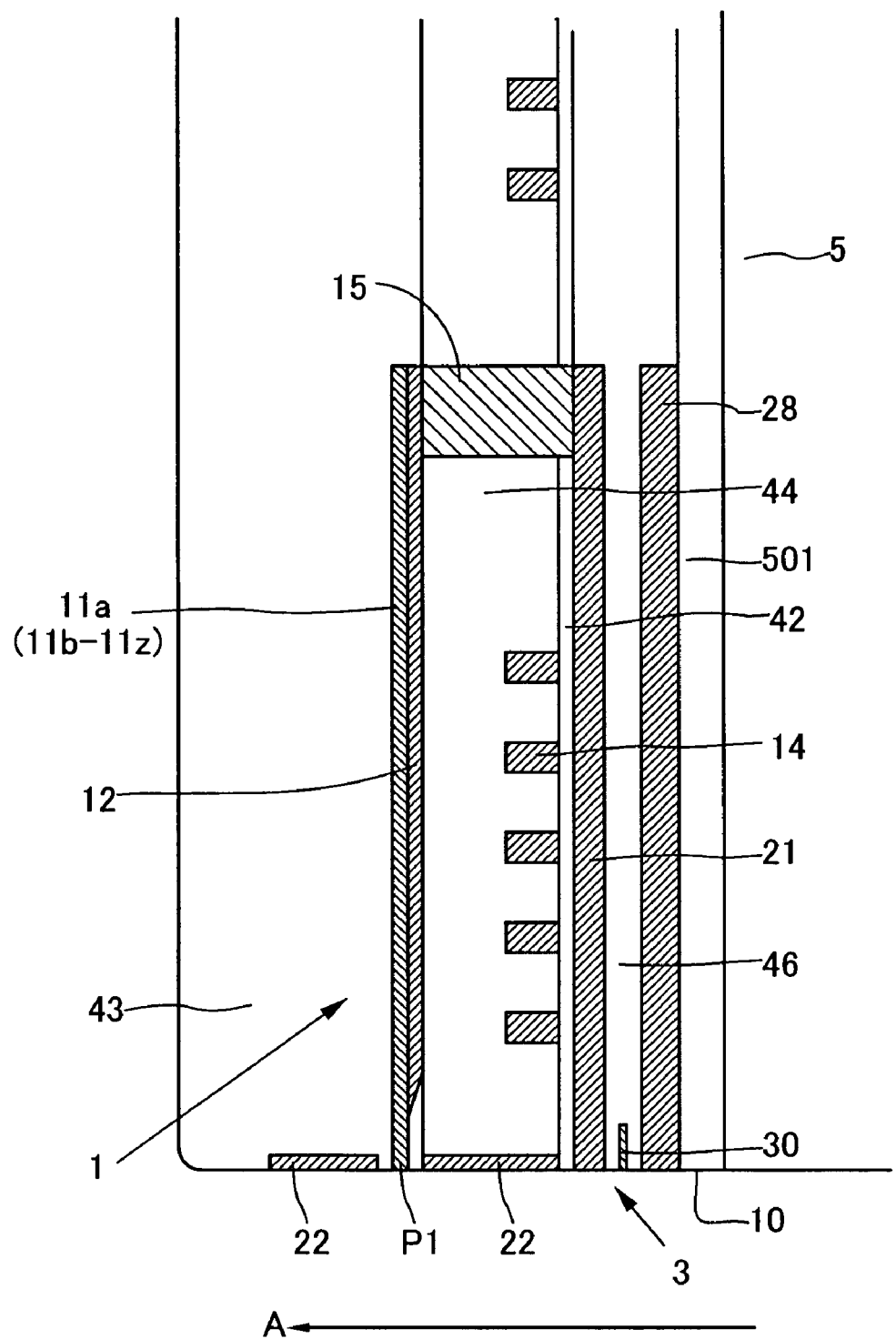
Figure 37:
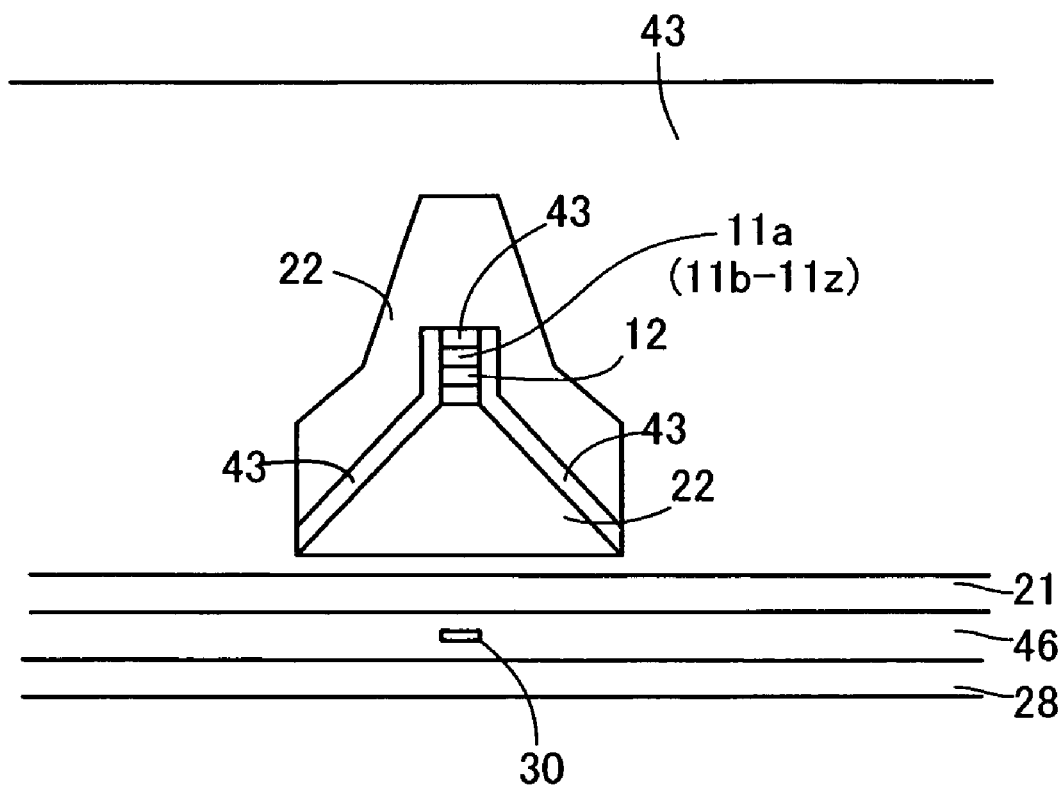

FIG. 36 is a sectional front view of the thin-film magnetic head achieved in yet another embodiment of the present invention, and FIG. 37 shows the thin-film magnetic head in FIG. 36, viewed from the ABS side. In the figures, the same reference numerals are assigned to components corresponding to those in FIGS. 33 to 35. In this embodiment, the auxiliary magnetic pole film 12 extends to a position set somewhat further back relative to the magnetic pole end P1 of the magnetic pole film 11a (11b to 11z), and the second shield film 22 is arranged around the magnetic pole end P1 so as to range parallel to the ABS 10. An insulating film 43 separates the second shield film 22 from the magnetic pole film 11a (11b to 11z) and the auxiliary magnetic pole 12.

By adopting one of the embodiments shown in FIGS. 34 through 36, each having the perpendicular magnetic recording element 1 explained in reference to FIGS. 1 through 30 used as a write element, the problem of the pole erase phenomena inherent to perpendicular magnetic recording can be eliminated, as well.

7. Magnetic Recording Head Device

Figure 38:
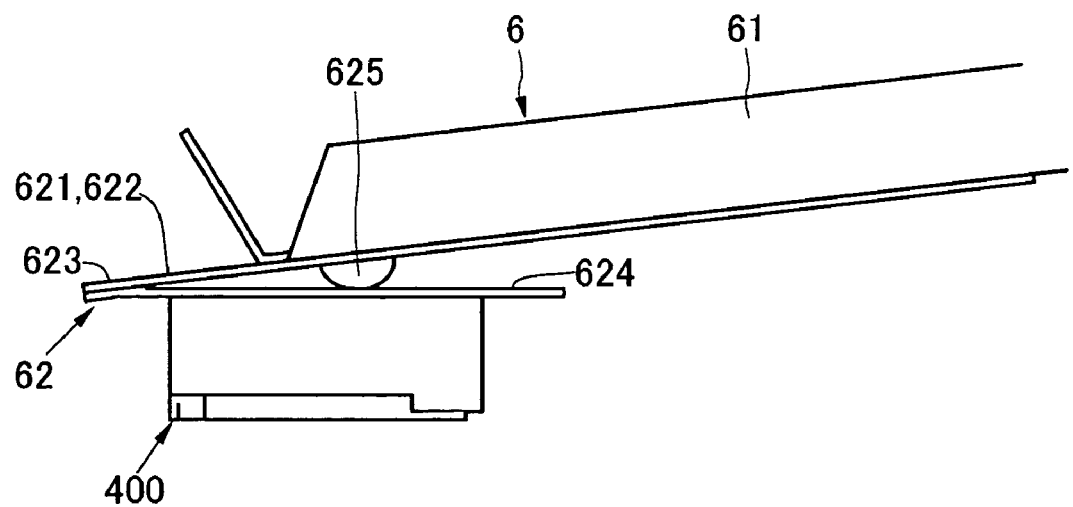
FIG. 38 is a front view of the magnetic head device according to the present invention.
Figure 39:
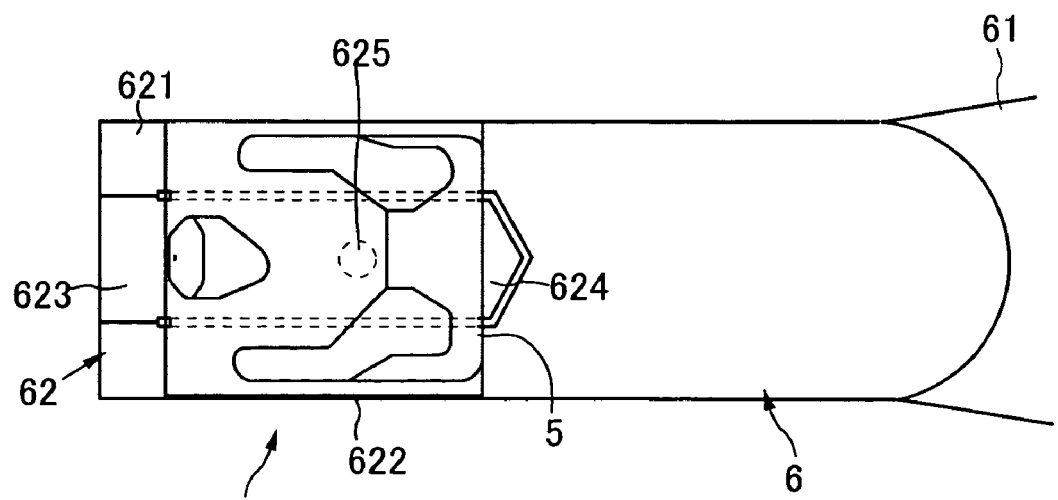
FIG. 39 is a bottom view of the magnetic head device in FIG. 38.

FIG. 38 is a front view of the magnetic head device according to the present invention and FIG. 39 is a bottom view of the magnetic head device shown in FIG. 38. The magnetic head device in the figures includes one of the thin-film magnetic hands 400 shown in FIGS. 31 to 36 and a head support device 6. The head support device 6 assumes a structure achieved by mounting a flexible member 62 constituted of a thin metal sheet at a free end of a support member 61 constituted of a metal sheet, which located on one side along the longitudinal direction, and mounting the thin-film magnetic head 400 at the bottom surface of the flexible member 62.

In more specific terms, the flexible member 62 includes two outer frame portions 621 and 622 extending substantially parallel to the longitudinal axis of the support member 61, a lateral frame 623 which connects the outer frame portions 621 and 622 at an end further away from the support member 61 and a tongue piece 624 extending substantially parallel to the outer frame portions 621 and 622 from an approximate center of the lateral frame 623 and having a free end at the front. One end of the flexible member 62, i.e., the end on the opposite side from the lateral frame 623, is attached to the support member 61 over an area near the free end of the support member 61 by a means such as welding.

A load projection 625, which may assume a semi-spherical shape, is arranged at the bottom surface of the support member 61. A load force is communicated from the free end of the support member 61 to the tongue piece 624 via the load projection 625.

The thin-film magnetic head 400 is mounted at the bottom surface of the tongue piece 624 by a means such as bonding. The thin-film magnetic head 400 is supported so as to be allowed to engage in a pitching movement and a rolling movement.

The present invention may be adopted in conjunction with a wide range of head support devices that have been proposed to date or will be proposed in the future, in addition to the head support device 6 used in the embodiment explained above. For instance, a head support device achieved by integrating the support member 61 and the tongue piece 624 at a flexible high polymer wiring board such as a tab tape (TAB) may be used instead. In addition, any of the head support devices known in the related art that assume a gimbal structure may be used.

8. Magnetic Recording/Reproducing Apparatus

Figure 40:
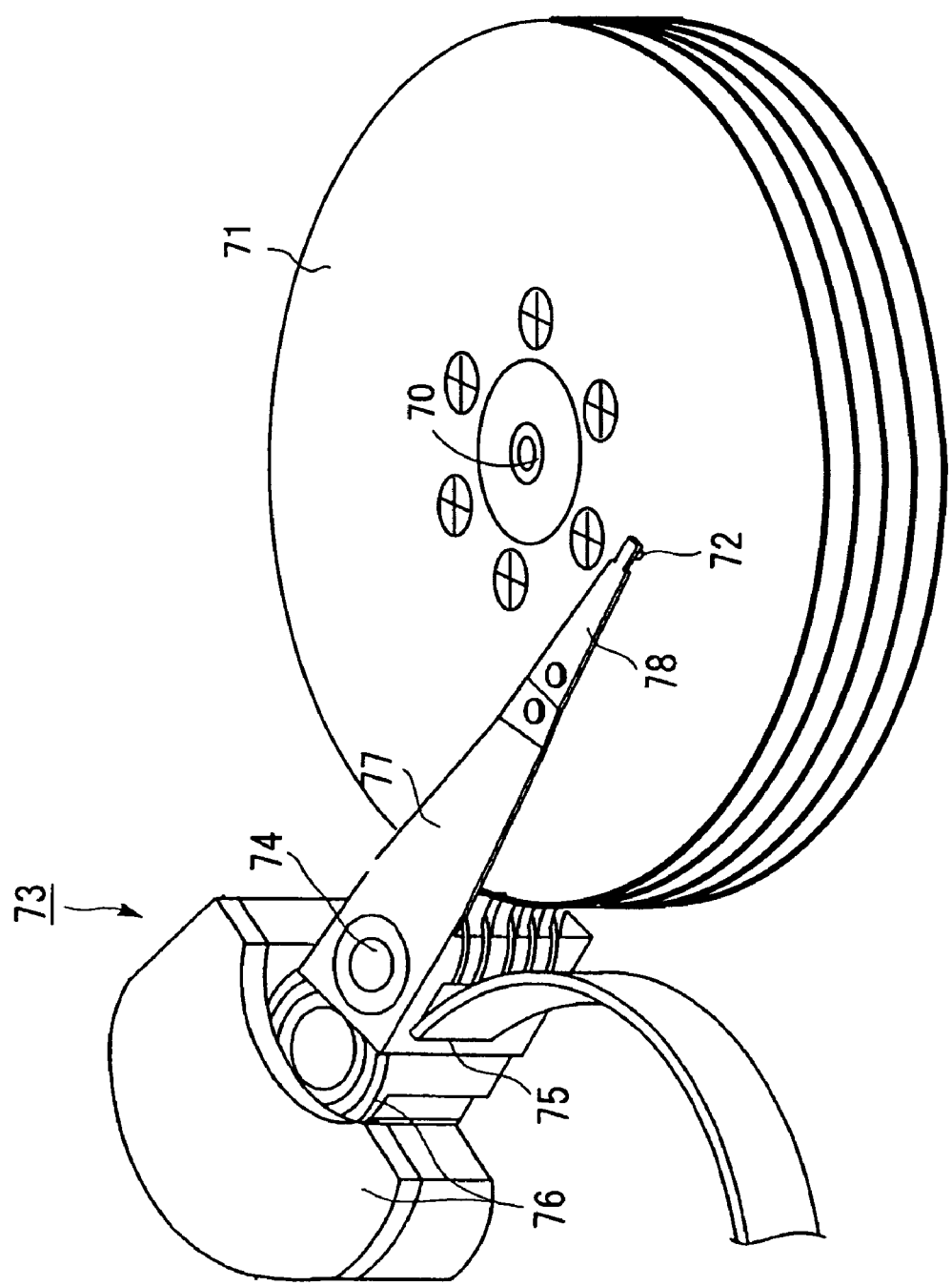
FIG. 40 is a perspective of a magnetic recording/reproducing apparatus achieved by using the magnetic head device shown in FIGS. 38 and 39.

FIG. 40 is a perspective of a magnetic recording/reproducing apparatus having the magnetic head device shown in FIGS. 38 and 39. The magnetic recording/reproducing apparatus in the figure includes magnetic disks 71 rotatably arranged around a shaft 70, thin-film magnetic heads 72 that record information into the magnetic disks 71 and also reproduce information recorded in the magnetic disks 71 and an assembly carriage device 73 used to position the thin-film magnetic heads on the tracks at the magnetic disks 71.

The assembly carriage device 73 mainly comprises a carriage 75 which is allowed to rotate around a shaft 74 and an actuator 76 constituted of, for instance, a voice coil motor (VCM) that rotationally drives the carriage 75.

The bases of a plurality of drive arms 77 stacked along the direction in which the shaft 74 extends are mounted at the carriage 75, with a head suspension assembly 78 having a thin-film magnetic head 72 mounted thereat bonded to the front end of each drive arm 77. Each head suspension assembly 78 is arranged at the front end of a drive arm 77 so as to set the thin-film magnetic head 72 located at the front end of the head suspension assembly to face opposite the surface of the corresponding magnetic disk 71.

The drive arm 77, its head suspension assembly 78 and corresponding thin-film magnetic head 72 forms the magnetic head device explained in reference to FIGS. 38 and 39. The thin-film magnetic head 72, which uses one of the perpendicular magnetic recording elements explained in reference to FIGS. 1 to 30 as its write element, may assume any of the structures explained in reference to FIGS. 31 to 37. Accordingly, the magnetic recording/reproducing apparatus in FIG. 40 achieves advantages explained in reference to FIGS. 1 through 30.

9. Test Data

Thin-film magnetic heads each having one of the perpendicular magnetic recording elements in FIGS. 1 through 30 were manufactured. The structures illustrated in FIGS. 31, 32, 36 and 37 were adopted in these thin-film magnetic heads. Magnetic head devices adopting the structure shown in FIGS. 38 and 39 were assembled by using the thin-film magnetic heads thus obtained, and the magnetic head devices were then used to manufacture magnetic recording/reproducing apparatuses adopting the structure shown in FIG. 40. The off-track characteristics of these magnetic recording/reproducing apparatuses manifesting when perpendicular magnetic recording media were used were measured. Details of the test are provided below.

(1) Production of Thin-film Magnetic Heads

After preparing a GMR element and a lead shield on in Altic substrate the soft magnetic film 111, the hard magnetic film 112a, the first nonmagnetic film 113 and an antiferromagnetic film, were prepared through DC magnetron sputtering. A writer magnetic pole was obtained by patterning the soft magnetic film 111 with a hard mask and subjecting it to processes of development, exposure and reactive ion etching. In addition, a writer magnetic pole 11 was constituted with a plated soft magnetic film 111 was obtained by patterning the soft magnetic film with a photomask, subjecting it to processes of development and exposure and then pattern-plating the soft magnetic film 111.

Samples with writer magnetic poles 11 that did not include any antiferromagnetic film underwent a process of vacuum annealing for three hours within a 200×79.6 (A/m) DC magnetic field at 250° C. Samples with writer magnetic poles having an antiferromagnetic film included therein underwent vacuum annealing for three hours within a 5000× 79.6 (A/m) DC magnetic field at 250° C. so as to ensure that the GMR elements remained unaffected. The samples then underwent polarization processing for 30 seconds in a 3000×79.6 (A/m) DC magnetic field in an atmosphere at room temperature and as a result, samples representing embodiments 1 through 16 were obtained. TABLE I indicates the compositions, the film thicknesses, the saturation magnetic flux density of the soft magnetic film 111 and the positions, the film structures, the film thicknesses and the correspondence diagrams with regard to the magnetic bias film in the writer magnetic pole films achieved in embodiments 1 to 16. Comparison examples 1 to 3 are samples with no magnetic bias film. The saturation magnetic flux density and the remanent magnetization were measured by using a vibrating sample magnetometer (VSM). The film thicknesses were measured with a surface roughness tester.

TABLE I

Figure 12:
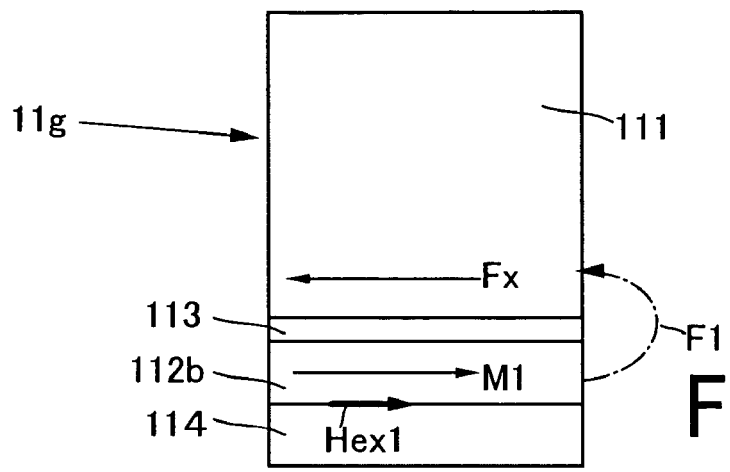

| | soft magnetic film | film thickness (nm) | B S (T) | position of bias film | film structure of bias film | film thickness of bias film (nm) | Figure |
|---|---|---|---|---|---|---|---|
| Embodiments 1 | FeCoZrO film | 180 | 2.1 | bottom | Cr/CoCrPt | 10/30 | FIG. 4 |
| Embodiments 2 | FeCoZrO film | 180 | 2.1 | upper | Ta/TiW/CoCrPt | 2/5/30 | FIG. 7 |
| Embodiments 3 | FeCoZrO film | 180 | 2.1 | bottom | NiFe/NiMn | 5/20 | FIG. 15 |
| Embodiments 4 | FeCoZrO film | 180 | 2.1 | bottom | Ta/NiFe/IrMn | 2/10/20 | FIG. 12 |
| Embodiments 5 | FeCoZrO film | 180 | 2.1 | upper | Ta/TiW/CoFe/PtMn | 20/50/20/20 | FIG. 13 |
| Embodiments 6 | FeCoZrO laminated film | 200 | 2.1 | bottom | Ta/CoFe/IrMn | 2/10/7 | FIG. 12 |
| Embodiments 7 | FeCo film | 200 | 2.4 | bottom | Cr/CoCrPtTa | 5/50 | FIG. 4 |
| Embodiments 8 | FeCo film | 200 | 2.4 | bottom | CoFe/Ru/CoFe/PtMn | 20/0.8/10/20 | FIG. 21 |
| Embodiments 9 | FeCo film | 200 | 2.4 | bottom | Ta/NiFe/PtMn | 2/15/20 | FIG. 12 |
| Embodiments 10 | FeCoNi film | 300 | 2.3 | bottom | Ta/CoFe/Ru/CoFe/PtMn | 2/20/0.8/15/20 | FIG. 18 |
| Embodiments 11 | CoNiFe film | 200 | 1.8 | bottom | Ta/NiFe/Rh/NiFe/PtMn | 2/30/0.7/15/20 | FIG. 18 |
| Embodiments 12 | FeNi film | 200 | 2 | bottom | Ta/CoFe/IrMn | 2/5/15 | FIG. 12 |
| Embodiments 13 | FeCo film | 250 | 2.2 | bottom | Ta/CoCrPt | 10/50 | FIG. 4 |
| Embodiments 14 | FeCoN film | 200 | 2.35 | bottom | CoFe/Cu/CoFe/PtMn | 20/115/20 | FIG. 18 |
| Embodiments 15 | FeN film | 200 | 2.05 | upper and bottom | CoPt | 20-20 | FIG. 11 |
| Embodiments 16 | FeN film | 200 | 2.05 | bottom | Ta/CoFe/Ru/CoFe/PtMn | 2/30/15/30/15 | FIG. 24 |
| Comparison example 1 | FeCoZrO film | 220 | 2.1 | | | | |
| Comparison example 2 | FeCo film | 300 | 2.4 | | | | |
| Comparison example 3 | FeCoZrO laminated film | 220 | 2.1 | | | | |

(2) Measurement of Characteristics

The off-track characteristics achieved in embodiments 1 through 16 and comparison examples 1 to 3 were measured. A spin stand (manufactured by Agilent: E 5022) was used to evaluate the occurrence of pole erase in media for perpendicular magnetic recording having a coercivity of 3300×79.6 (A/m). Each track of the media being evaluated was divided into 75 sectors, and after recording the high-frequency signal in all the sectors once, a high-frequency signal was overwritten with a low-frequency signal at the beginning of each sector over a length equivalent to 1/30 of the sector length, and the amplitude of the high-frequency signal was measured. This process was repeated 100 times. A track adjacent to each recording track underwent a DC+DC− and AC erasure over 20 μm. If the amplitude of the output signal of the high-frequency signal was reduced by at least 10% under these circumstances, it was deemed that "pole erase has occurred". TABLE II presents the results of the measurement.

TABLE II

| | fall rate of amplitude of output signals after recording process was repeated 100 tines (%) | | |
|---|---|---|---|
| | AC erase | DC + erase | DC − erase |
| Embodiments 1 | 100 | 100 | 100 |
| Embodiments 2 | 100 | 99 | 99 |
| Embodiments 3 | 100 | 100 | 95 |
| Embodiments 4 | 100 | 99 | 96 |
| Embodiments 5 | 99 | 99 | 95 |
| Embodiments 6 | 98 | 99 | 92 |
| Embodiments 7 | 100 | 100 | 100 |
| Embodiments 8 | 100 | 99 | 95 |
| Embodiments 9 | 100 | 99 | 96 |
| Embodiments 10 | 96 | 96 | 98 |
| Embodiments 11 | 95 | 96 | 94 |
| Embodiments 12 | 97 | 98 | 96 |
| Embodiments 13 | 100 | 99 | 100 |
| Embodiments 14 | 99 | 100 | 97 |
| Embodiments 15 | 100 | 100 | 100 |
| Embodiments 16 | 100 | 100 | 100 |
| Comparison example 1 | 89 | 80 | 65 |
| Comparison example 2 | 72 | 66 | 43 |
| Comparison example 3 | 95 | 84 | 72 |

TABLES I and II indicate that while the amplitudes of the output signals were reduced due to pole erase in comparison examples 1 to 3 using an FeCoZrO single layer film, an FeCo single layer film and an FeCoZrO stacked film respectively, none of embodiments 1 through 16 manifested a reduction in the amplitude of 10% or more due to pole erase, as TABLE II indicates.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A perpendicular magnetic recording element having a magnetic pole film, comprising:
   a soft magnetic film assuming a hard axis along a direction in which a magnetic field is generated and an easy axis along a direction perpendicular to the direction of the perpendicular writer magnetic field; and
   a magnetic bias film which applies a magnetic bias to said soft magnetic film along said easy axis, said magnetic bias film includes a first ferromagnetic film and a first antiferromagnetic film, which are stacked on each other.

2. The perpendicular magnetic recording element of claim 1, wherein:

the stacked film constituted with said first ferromagnetic film and said first antiferromagnetic film is arranged adjacent to said soft magnetic film.

3. The perpendicular magnetic recording element of claim 2, wherein:

said first nonmagnetic film has a film thickness set within a range of 0.5 to 30 nm.

4. The perpendicular magnetic recording element of claim 1, wherein:

said magnetic bias film includes a first nonmagnetic film arranged between said first ferromagnetic film and said soft magnetic film.

5. The perpendicular magnetic recording element of claim 1, wherein:

said first antiferromagnetic film has a film thickness set within a range of 3 to 50 nm.

6. The perpendicular magnetic recording element of claim 1, wherein:

said first ferromagnetic film has a film thickness set within a range of 1 to 20 nm.

* * * * *